(12) United States Patent
Forsythe

(10) Patent No.: US 8,892,513 B2
(45) Date of Patent: Nov. 18, 2014

(54) METHOD, PROCESS AND SYSTEM TO ATOMICALLY STRUCTURE VARIED DATA AND TRANSFORM INTO CONTEXT ASSOCIATED DATA

(75) Inventor: Hamish Forsythe, Palo Alto, CA (US)

(73) Assignee: U9T Inc, San Mateo, CA (US)

( * ) Notice: Subject to any disclaimer, the term of this patent is extended or adjusted under 35 U.S.C. 154(b) by 54 days.

(21) Appl. No.: 13/563,697

(22) Filed: Jul. 31, 2012

(65) Prior Publication Data

US 2013/0110775 A1 May 2, 2013

Related U.S. Application Data

(60) Provisional application No. 61/553,929, filed on Oct. 31, 2011.

(51) Int. Cl.
*G06F 17/30* (2006.01)

(52) U.S. Cl.
CPC .... *G06F 17/30943* (2013.01); *G06F 17/30578* (2013.01)
USPC ........................................................ 707/613

(58) Field of Classification Search
CPC .............. G06F 17/30; G06F 17/30578; G06F 11/2074; G06F 17/30943
USPC ........................................................ 707/613
See application file for complete search history.

(56) References Cited

U.S. PATENT DOCUMENTS

| | | | |
|---|---|---|---|
| 5,680,619 A * | 10/1997 | Gudmundson et al. ....... | 717/108 |
| 5,991,765 A * | 11/1999 | Vethe .................................... | 1/1 |
| 6,279,149 B1 * | 8/2001 | Field et al. ..................... | 717/129 |
| 8,065,739 B1 * | 11/2011 | Bruening et al. ............... | 726/26 |
| 8,312,273 B2 * | 11/2012 | Nice et al. ..................... | 713/168 |
| 8,364,540 B2 * | 1/2013 | Soroca et al. .............. | 705/14.64 |
| 8,533,013 B2 * | 9/2013 | Cole ............................ | 705/7.32 |
| 2003/0225921 A1 * | 12/2003 | Hostetter et al. .............. | 709/311 |
| 2003/0236794 A1 * | 12/2003 | Hostetter et al. .............. | 707/101 |
| 2004/0006506 A1 * | 1/2004 | Hoang ............................. | 705/10 |
| 2006/0136670 A1 * | 6/2006 | Brown et al. .................. | 711/118 |
| 2008/0028300 A1 * | 1/2008 | Krieger et al. ................ | 715/255 |
| 2009/0030803 A1 * | 1/2009 | Mohan ............................. | 705/26 |
| 2009/0112880 A1 * | 4/2009 | Oliveira et al. ................ | 707/10 |
| 2009/0125796 A1 * | 5/2009 | Day et al. ...................... | 715/219 |
| 2009/0164315 A1 * | 6/2009 | Rothman ........................ | 705/14 |
| 2010/0076994 A1 * | 3/2010 | Soroca et al. ................. | 707/769 |
| 2010/0094878 A1 * | 4/2010 | Soroca et al. ................. | 707/748 |
| 2010/0185362 A1 * | 7/2010 | Vialatte et al. ................. | 701/35 |
| 2010/0306269 A1 * | 12/2010 | Osmond ....................... | 707/792 |
| 2010/0332404 A1 * | 12/2010 | Valin ............................. | 705/310 |
| 2011/0083013 A1 * | 4/2011 | Nice et al. ..................... | 713/168 |
| 2011/0099142 A1 * | 4/2011 | Karjalainen et al. .......... | 707/600 |

(Continued)

*Primary Examiner* — Jean B Fleurantin
*Assistant Examiner* — Nargis Sultana
(74) *Attorney, Agent, or Firm* — Geeta Kadambi; Riddhi IP LLC

(57) ABSTRACT

A novel method, system and process for the enterprise software are described. The data is created, captured, ingested, stored, atomized, monitored, separated, analyzed, enriched, correlated, managed, automated, processed, isolated, secured and synthesized (for example published or automatically pushed to user). The data is recreated using automated contextual delivery methods and processes. This process enables a user to regulate the industry wide leading practices and constantly enrich data. Task allocation is automated. This SaaS and/or Cloud computing system may be installed and distributed across users' device, public cloud, behind a company's firewall and/or additional security may be provided using privacy vault. This method, system and process for this software may be implemented on a machine readable media.

21 Claims, 20 Drawing Sheets

(56) References Cited

U.S. PATENT DOCUMENTS

2011/0196828 A1* 8/2011 Drobychev et al. .......... 707/622
2012/0095881 A1* 4/2012 Rothman ..................... 705/27.2
2012/0239724 A1* 9/2012 Masini et al. ................. 709/202
2012/0303578 A1* 11/2012 Calder et al. .................. 707/615

* cited by examiner

METHOD, PROCESS AND SYSTEM TO ATOMICALLY STRUCTURE VARIED DATA AND TRANSFORM INTO CONTEXT ASSOCIATED DATA

CROSS REFERENCE TO RELATED APPLICATION

The instant application is a utility application of the previously filed U.S. Provisional Application 61/553,929 filed on 31 Oct. 2011. The pending U.S. Provisional Application 61/553,929 is hereby incorporated by reference in its entireties for all of its teachings.

FIELD OF TECHNOLOGY

This disclosure relates generally to a method, process and system to manage data dynamically and/or statically. More specifically it enables the user and/or organization to create and utilize data efficiently by atomically structuring of varied data and transform into a context associated data in a data management system, an organizational environment and/or social media environment.

BACKGROUND

There are many enterprise based data and content management software programs for the user to get access to existing data and upload forms created in different departments to fill out and process. Disparate data contained in static pages, email, video, images, etc. are created without interacting with each other and often the information is old. Most companies struggle with disparate data, storage and retrieval solutions and version control issues. There is a need for an improved system solution that is appropriate for all users and increased access to information in being more productive.

SUMMARY

Disclosed herein are a method, process and system to monitor, recognize, capture, atomize, separate, correlate, recreate, store, manage, dynamically analyze and synthesize, enrich, secure and automate contextual delivery of varied data such as, but not limited to, internal, internet, and/or enterprise wide audio, video, image, sensor data, numerical and textual data (raw data as well) for individual or multiple users using layered asynchronous context enrichment (LACE) software on a machine-readable medium. All the embodiments mentioned below and in the detailed description use layered asynchronous context enrichment software on a machine-readable medium to perform each function. In one embodiment, varied data are contextually analyzed and enriched for an individual user and/or enterprise user. Examples of varied data may be structured, semi-structured, unstructured and raw data. The data may also be represented in different formats such as, but not limited to various formats of varied data, atomized and correlated data, new data, content data and context enriched data and the examples are given in detailed description section of the instant application. In another embodiment, auto publishing is enabled autonomously because context enriched data is also stored not only as a data but also as a template.

In one aspect, a method includes registering and interpreting the data that is produced, published, distributed, interacted and disseminated in an enterprise, individual and/or social environment in any data format (structured, semi-structured or unstructured) any format. In another embodiment, the produced data or data while being produced (statically and/or dynamically) is evaluated and enriched, disseminated and stored in various locations. Once the data is fractioned (atomized) and correlated for contextual content it may be stored in any format. In another embodiment, the recombination and/or recreation of the atomized data are performed using an algorithm to provide context based retrieval and assembly.

The data in, another embodiment, may be atomized based on content or context dynamically (when it is being created, used, disseminated) and stored securely in different locations for security purposes. The storage of data may be done by using a predetermined algorithm for separating more sensitive data from less or non-sensitive data and store them at the same location, in place and/or in multiple locations. In another embodiment, rich context gathering method and process makes it easy to deliver data from closest proximity to user. For example from mobile user to nearest gateway node to nearest cached relevant data units (not entire blobs or files) in the data center. In another embodiment, once the varied data is produced, captured, atomized, separated, correlated, annotated and value added, recreated, stored, managed, presented, dynamically analyzed and synthesized, enriched, secured then the data is automatically contextually delivered using any media such as an internal system, internet, and/or enterprise wide audio, video, image, sensor data and textual data (raw data as well) for individual or multiple users. In another embodiment, layered Natural Language Processing (NLP), Assisted Learning, machine learning, or any other combined AI or knowledge based analysis may be performed on the data. In another embodiment, when a specific document is being created, edited or formatted the knowledge based analysis algorithm might provide alternative formats or augmentation to comply with a certain regulation based format. These tasks may be performed dynamically or statically.

In one embodiment, enrichment of data is performed by contextual associations, correlations and reassembly. In order to enrich, in one embodiment, the data may be atomized in multiple layered approaches and/or varied overlapping segments. One method might be a single layer, single sentence, clauses, or multilayered, such as word association patterns, key words, key phrases, externally linked words or entities, word roots, suffixes or prefixes, expertise patterns, expertise acquisition, expert availability, past document success rate or outcomes, added annotation by harvesting from external sources such as a web or social media content. During reassembly the data may be analyzed and best practices may be incorporated for document formation. In another embodiment, fractioning, partitioning, parsing, segmenting, atomizing either in combination or alone enables the data to be compressed many fold and yet be distributed at various levels for storage. This has many implications for significantly improving the speed, cost, performance and reliability of storage methods and systems including, but not limited to: security, privacy, QOS, data deduplication, disaster recovery (DR), back-ups, data compression, data routing, network data transmission speeds (e.g., limited bandwidth networks, mobile device connection to datacenter etc.). In one embodiment, a system with unified hardware may host all or parts of the system integration enterprise software. The system may contain hardware and software related to administration, atomic subsystem, correlation subsystem, sentient processor subsystem, preprocessor subsystem, layered search and query subsystem, application program interfaces, job manager subsystem, layered asynchronous context enrichment subsystem, and privacy vault within the client firewall and/or on distributed cloud computers (including mobile and e-devices, wearable, embedded, implanted, etc.).

In one embodiment, an automatic process of data input, collection, re-examination of dependent attributes and outcomes, redefining of relevance, relevance matching algorithms, predictive analytics, machine learning, assisted learning, NLP, and other AI methods can be layered and components of these can be dynamically performed at both the software and hardware processor level. In another embodiment, workflow based document software enables the user to login, retrieve, allocate, edit and redistribute the content using either a document, web based application, collaborative application, social application, mobile application, audio conversation or video conferencing, graphics or animation application, financial application, enterprise application software (EAS), online shopping and online payment processing, interactive product catalogue, automated billing systems, security, enterprise content management, IT service management, customer relationship management, enterprise resource planning, business intelligence, project management, collaboration, human resource management, manufacturing, enterprise application integration, and enterprise forms automation. The audio and video files are also processed for content and the same steps are implemented to atomize, store, map relevance and retrieve for individual or enterprise user.

In one embodiment, LACE is used in the process to determine the correlation confidence, context/content/attribute voids and change events to annotate the atomized data. In another embodiment, a job manager subsystem operates centrally, asynchronously and dynamically to other subsystems to interpret, assess, process, monitor, automate, ingest, collect, provide access control and manage data. The job manager can dynamically combine modular software components called Atomic Software Components and tune or adjust based on outcomes or feedback from anywhere across the context enrichment system and extended networked system.

The methods, process and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF DRAWINGS

The embodiments of this invention are illustrated by way of example and not limitation in the figures of the accompanying drawings, in which like references indicate similar elements and in which:

FIG. 11 shows how marketing data 1100 is enriched, according to one or more embodiments.

FIG. 12, shows how sales data 1200 is enriched, according to one or more embodiments.

FIG. 13 shows how recruitment data 1300 is enriched, according to one or more embodiments.

FIG. 15 shows how finance data 1500 is enriched, according to one or more embodiments.

FIG. 16 shows how insurance data 1600 is enriched, according to one or more embodiments.

Figure 17:
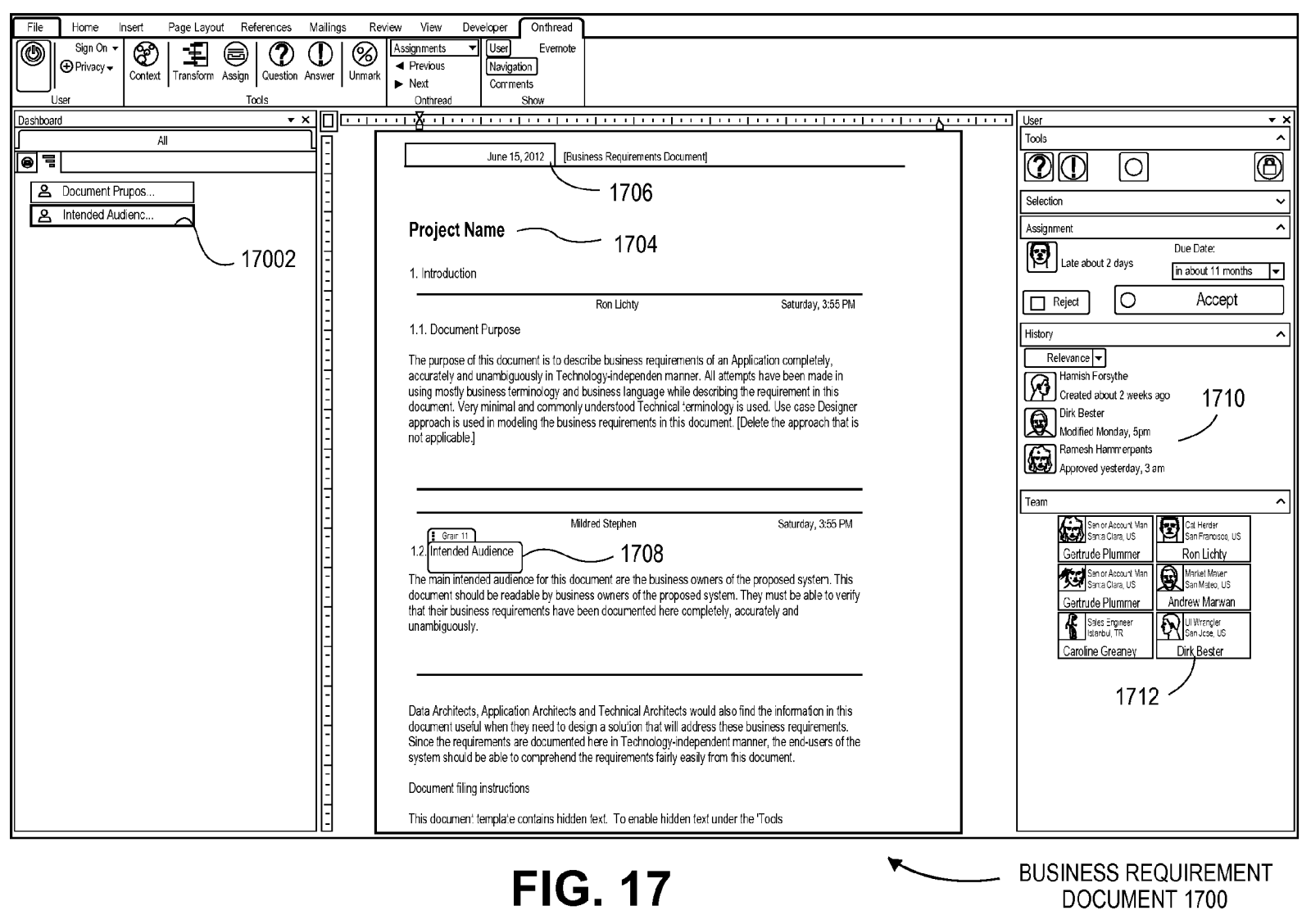

FIG. 17 shows how business requirement document 1700 is enriched, according to one or more embodiments.

Other features of the present embodiments will be apparent from the detailed description that follows.

DETAILED DESCRIPTION

Example embodiments, as described below, may be used as a method, process and system to atomically structure varied data (and/or content data) and transform into context associated data using layered asynchronous context enrichment software on a machine-readable medium.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
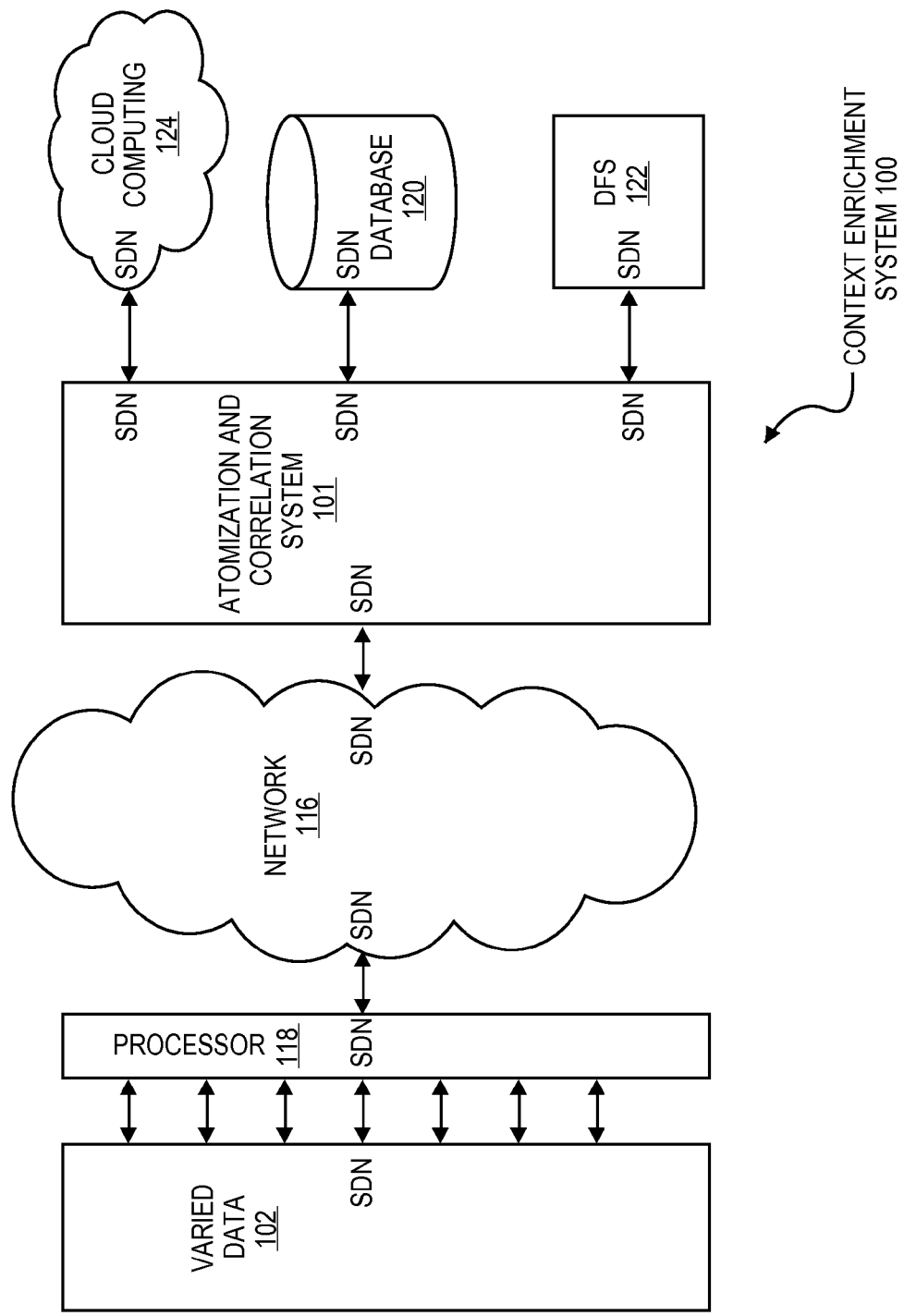
FIG. 1 is a context enrichment system 100 view, according to one or more embodiments.

FIG. 1 shows a context enrichment system 100, according to one or more embodiments. Varied data 102 may be connected to a processor 118 or created in any other computer medium and be connected with atomic and correlation system 101 through a network 116. Atomic and correlation system 101 may be connected to cloud computing 124, database 120 and distributed file system (DFS) 122 to form a context enrichment system 100.

In one or more embodiments, the atomic and correlation system 101 may be coupled to a processor 118 inside a host data processing system (e.g., a remote server or a local server) through a wired interface and/or a wireless interface. A network (e.g., a wireless network 116, or a wired network, and the like) may be accessed through the host data processing system. In one or more embodiments, the data processing system may be an internal processing component of the context enrichment system 100 embedded in the host system. The wireless network 116 may comprise, but not limited to HomeRF, HiperLAN, Bluetooth, Zigbee, WiMAX, Wibree, FM, AM, 802.11 (G, N), WiFi and satellite, Wireless ISP, Satellite Broadband, Mobile Broadband, Local Multipoint Distribution Service and satellite communication systems etc.

Figure 2:
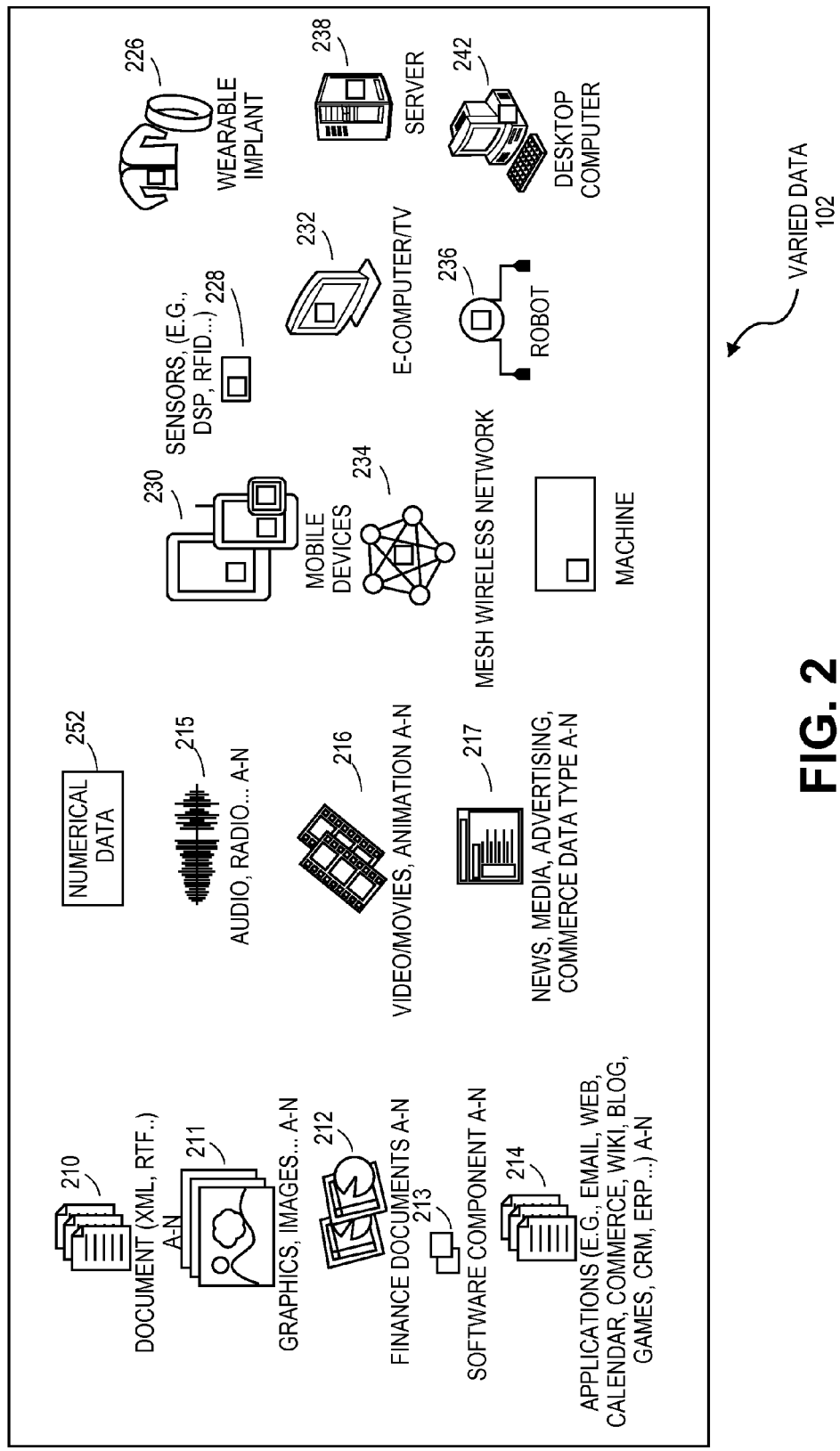
FIG. 2 shows example of varied data 102, according to one or more embodiments.

FIG. 2 shows, as an example but not limited to, varied data 102 sources that may be structured or unstructured. The varied data may be internal data, such as created by the user and/or enterprise. Relevant external data could be acquired by the user and/or enterprise from outside to support the internal data or for any other purpose. Varied data comprises of video, audio, graphics, mesh wireless network data 234, robotic data, e-computer/TV 232, server data 238, desk top computer 242, wearable clothing sensor data 226, mobile device data 230, finance document 212, software component data 213, applications such as email, web data (e.g., html, CSS, Javascript, xhtml etc.), calendar, games CRM, ERP, SFA, blogs, social media, chats, newsfeeds, social streams or feeds, RSS, movies, animation 216, radio 215, machine data 244, sensor, RFID, DSP data 228, graphics 211, images 211, document 210, news, media, advertising 217, wiki, blog 214, augmented reality, implant data, software components (e.g., compiled or uncompiled), software scripting language data (e.g., compiled or uncompiled) and commerce data. Examples of structured, unstructured and raw data, in other words varied data, content data, context enriched data, atomized and correlated data and new data may be present in the form of, but not limited to, are data formats such as corporate data (audio recordings, social media content, image, raw data, sensor data and/or video streams, ERP, content, document and information management, Salesforce.com (e.g., sales/service cloud, chatter), Directory (e.g., Active Directory), LDAP, social media content like the Twitter "firehose" or profiles from LinkedIn, presence, directory, email servers, Internet teleconferencing (e.g., Webex, Telepresence, video sharing, publishing, sensor data, and images type of software, enterprise data, internet data, social media data, raw data and stored metadata such as .xlsx (of Microsoft Excel), .docx (of Word), .pptx of Microsoft PowerPoint), .rtf, .pdf, sms, tweets, chats, RSS, DSP, emails, Web content (.html, CSS, xhtml), raw data, sensor data, web feeds or news feeds, image, raw data, sensor data and/or video streams, consumer and entertainment data, audio data, game data, animation data, data from genetic sequences, protein sequences, patient images, augmented reality enrichment from wearable and or mobile devices, input from sensor or camera, QR codes/bar scans/RFID, near field or wireless input, sensors, home appliances, component of a graphic and/or video segment, implant data (e.g., hearing aid), financial data, marketing data, insurance data, project data, sales data, service and support data, social data, scientific data and health care data, GPS, software programming data, binary data etc. Patterned context associations external to video segments (for example in a text document) can be associated directly with audio transcription from video segments by contextually associated data or by referencing an association indirectly through, for example, a text document script. The video can be automatically segmented or atomized in a related method to text based content. For example, but not limited to, Cisco MXR 3500 which is currently limited to enabling a search capability on keywords, phrases and defined tags. This Cisco MXR 3500 example is Google equivalent for video which is based upon Audio transcription and time markers which represent the video and audio segments associated with detected key words and phrases. Leveraging the existing content, LACE would exhaustively and cyclically collect context around segments/grains and continue to build associations of (e.g., customers that viewed segments or grains of videos and automatically recommend these grains or segments to other customers under similar context, or for training, similar roles like early learning from the lead technologist that just rolled out a white paper.

Figure 3:
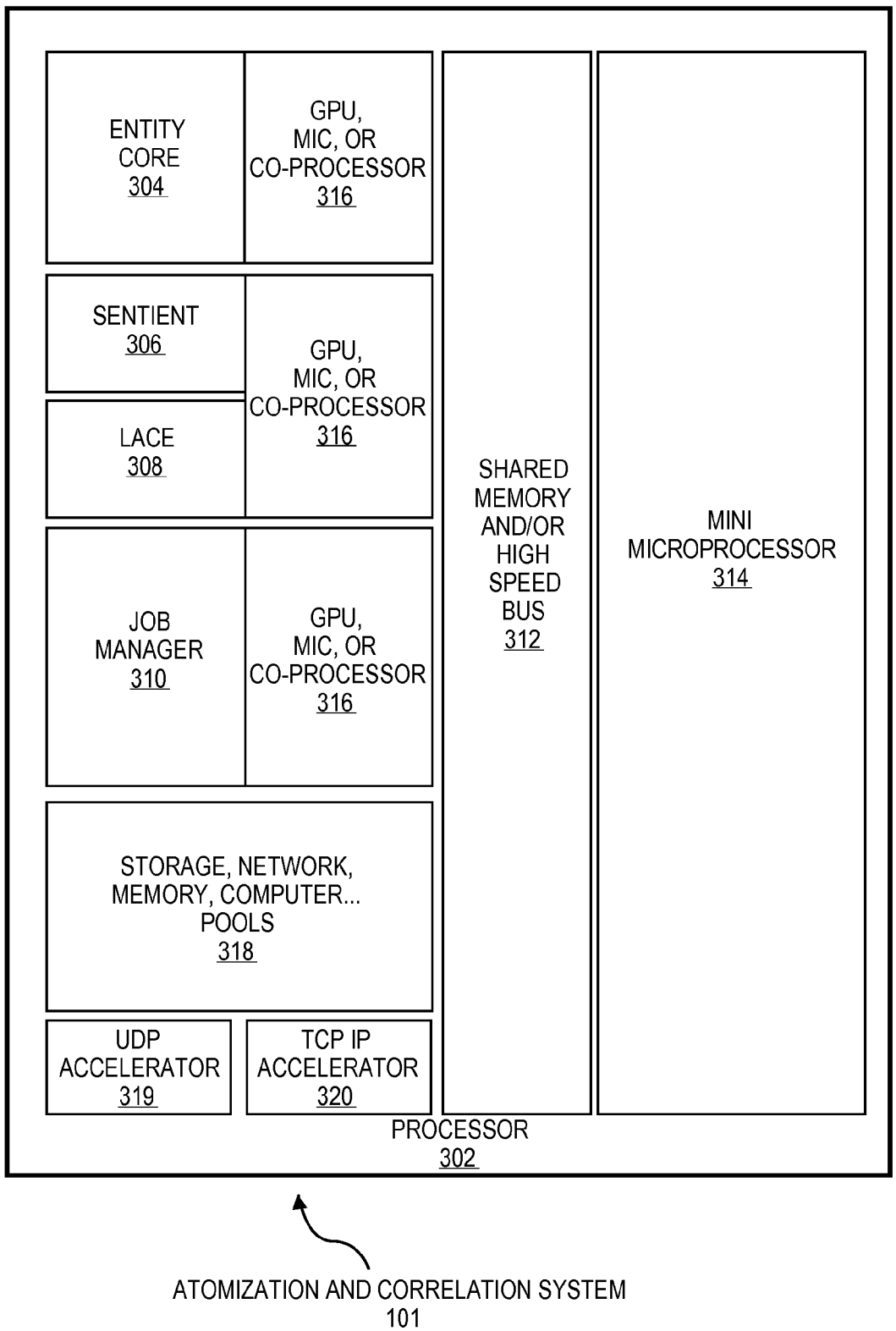
FIG. 3 shows an integrated atomic and correlation system 101, according to one or more embodiments.

FIG. 3 shows the atomic and correlation system 101 that enables the layered asynchronous context enrichment software (LACE) and other software modules and systems to atomize the content data and add value by combining varied data to internal data and external data. Varied data may also be defined as relevant external data. The user may communicate with a device containing a distributed atomizer, Natural Language Processor (NLP) or other machine learning pre-processor, job manager, LACE software and a privacy vault along with other housekeeping software before or after a firewall. The data generated by the user may be stored on multiple layers or levels including but not limited to on the user mobile and/or desktop device, in a database behind the firewall, a cloud computing environment or on a networking switch. The processor may reside in the same hardware as the processing hardware housing LACE etc. The processor to atomize the data may reside outside of the hardware housing LACE etc. At every step of processing or transferring data from one hardware or software subsystem to the other hardware or software subsystem via the network or cloud, strict security measures are implemented.

FIG. 3 shows an integrated view of the processing unit. The Atomic subsystem helps to create atomic data and context creation, extraction, filtering, sifting, capturing, for documents, video, user interface and data that are used for collaboration, authoring, dissemination and publishing. The software may be used for providing cyber security as it can also perform associations, enrichment, resynthesize, combining context based documents. The software also may be implemented in an automation environment, governance and highly regulated industry such as FDA or other government organizations. The atomized data may be automatically stored in disparate and disassociated sites and/or varied layers of protection to enhance the security, privacy and prevent data theft.

The system provides at least one of collaboration services, structured, unstructured and raw data and context management. It may also provide context enriched data delivery services for enterprise application software (EAS) such as but not limited to: online shopping and online payment processing, interactive product catalogue, automated billing systems, security, enterprise content management, IT service management, customer relationship management (CRM), enterprise resource planning (ERP), business intelligence, project management, collaboration, human resource management, manufacturing, enterprise application integration, enterprise forms automation, Unified communications (UC), content web management, social media, social enterprise, sales enablement, marketing automation, Customer Experience Management (CEM or CXM), Social Media Monitoring, Wikis, Marketing Automation, Marketing Intelligence, BI and legacy enterprise content environments, embedded in News/Media, Mobile and desktop Commerce and advertising, websites and social sites, 2D and 3D engineering drawings, graphics, paint and/or illustration, CAD, image processing, video and audio conferencing, audio and video processing/editing. The system enables organizations to scale and cost-effectively create, store, manage, collaborate, deliver, contextually enrich and protect structured and unstructured data.

The privacy vaults are built for every customer or client separately. The privacy vault enhances the privacy for a client to the next level. Due to the atomization of data and the storage method, personal identifiers can be systematically isolated. Proprietary algorithms enable the data to be secure and retrieval, monitoring and management is done by an automated secure multistage data retrieval system.

FIG. 3 also describes a method that comprises of data creation by an individual in an enterprise system. For example in a sales use-case, a user may load a unique request for information (RFI) document provided by a customer. The user can choose to transform the new document to atoms and correlations which are stored separately. The system may automatically deliver formatted content into this document in response to user identified questions. One user panel may automatically assign atoms of content to the most appropriate resource. If the person needs a team member to work with him/her the system automatically allocates resources based on prior participation or expertise in the organization and resource schedule and availability from an integrated calendar service such as Microsoft Exchange Server or Cisco Presence Server. Any arbitrary length segment of a long contract document might be automatically allocated to the most appropriate and available person. Depending on the level of expertise and access level parts of the document or the entire document may be revealed to a particular user for edit, or approval such as corporate marketing edits or legal or management approval. If the document is being modified the atomizer also suggests alternate content and/or formats that are used as leading practice or winning proposals that have been successful in a prior instance. This function allows the organization to be effective and have a standard format available to each and every user in that particular group.

Atomization of the data is done using a proprietary algorithm and value is added by contextual enrichment. Layered asynchronous context enrichment (LACE) is performed. This process re-examines dependent attributes, re-defines relevance utilizing such methods as layered matching algorithms, artificial intelligence (AI) and NLP. The resultant data may be stored in a single vault or across multiple privacy vaults. Security enhancement may be added to the data stored in the privacy vault by assigning a multistage authentication method.

The entity core 304 is the distributed database that provides the dense context associations, correlations and relationships between all data and metadata from raw data to structured data and everything in between. It stores the natural order of data within applications, reference templates and user environments and efficiently captures its changes over time.

The job manager 310 is another subsystem that dynamically assembles software components for such example but not limited to: ingesting, analyzing, distributing, dispatching, conditional expressions, predicting, processing, managing, filtering, automating and monitoring all data including other software components. In addition but not limited to controlling other internal or external integrated or non-integrated software systems.

UDP accelerator subsystem 319 is a lower level software protocol to such common protocols as TCP/IP. This subsystem can be accelerated by hardware and provides dramatic acceleration of large data transfers between datacenters where there are large distances, aggressive and/or competitive network conditions which are common to Internet and other WANs.

A microprocessor 314 within a processor 302 may manage data cryptography, data segment shuffle, data compression, and could be FPGA or ASIC.

Figure 4:
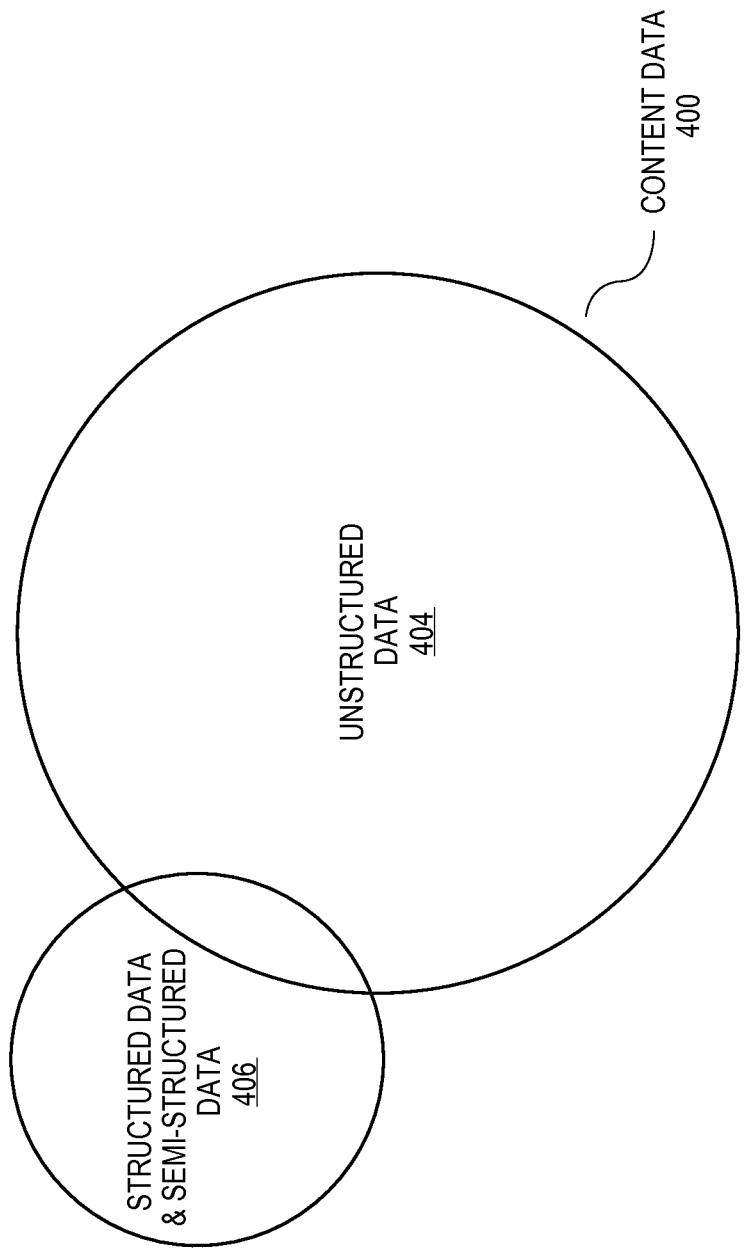
FIG. 4 shows depiction of content data 400 as it exists as a prior art.

FIG. 4 shows a prior art of how there are plethora of unstructured data 404 compared to structured and semi structured data 406 is available to any user and/or enterprise. The instant system provides at least one of collaboration services, structured, unstructured and raw data and context management. It may also provide context enriched data delivery services for such applications as ERP, Unified communications (UC), CRM, content web management, social enterprise, sales enablement, marketing automation, CXM, BI and legacy enterprise content environments embedded in News/Media, Mobile and desktop Commerce and advertising, websites and social sites using the sentient processor 306. The system enables organizations to scale and cost-effectively create, store, manage, collaborate, deliver, contextually enrich and protect structured and unstructured data.

Figure 5:
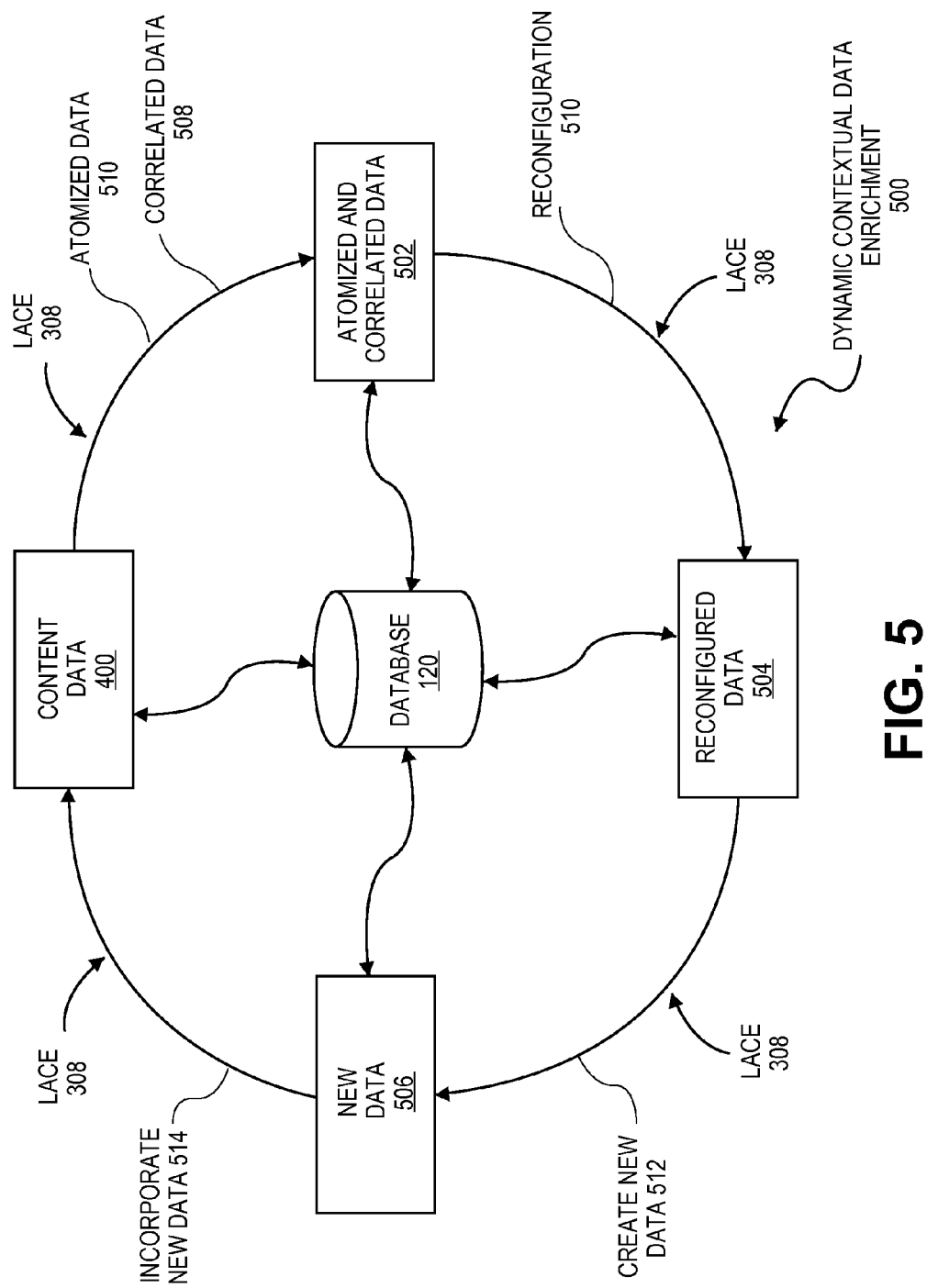
FIG. 5 shows the dynamic contextual data enrichment 500 method and process, according to one or more embodiments.

FIG. 5 shows the cyclical performance of the LACE 308 software claimed in the instant application. The dynamic contextual data enrichment 500 is a powerful tool for any user and/or enterprise to dynamically enrich varied data that has been ingested into the system as content data 400 for the instant application by the user and/or enterprise wide users. Content data may be varied data 102 and used as content data by the user. The system and method of data management recognizes the natural structure of the data present in a given environment that the user and/or the enterprise data using as a content data 400. The content data may be a combination of varied data and user created data. The content data may also be atomized, and context associated data. The natural structure data may be captured from any other devices, including for example: sensors, servers, user software environment, user application or software reference template at the present time or any other time of change. This enables LACE to interpret the content data for further processing and applying rules and constraints created by the user or by outcomes automatically monitored by distributed software components in the Job Manager subsystem made up of dynamically assembled atomic software components. The term user is interchangeably used for the terms enterprise wide users or an individual user throughout this application (ie., user can be a worker within a company but also an individual consumer). Internal data is a data created by the user or that resides in the computer and/or the enterprise wide data. For example, but not limited to, text documents, financial spread sheets, email, chats, video conferencing, forms, social streams or feeds, ERP, CRM, data residing in the database etc., and various examples that is shown in FIG. 2. External data may be the data that is imported or acquired by the user, for example but not limited to social sites, microblogs and blogs, audio, video, news/media, TV clippings etc. In some circumstances the examples of external data may be an internal data for certain users and vice versa.

LACE creates an atomized data 510 and correlated data 508 for creating atomized and correlated data 502. LACE creates atomized data and harvests context from varied data, external data and internal data to correlate data. LACE runs on a machine readable medium to transform the atomized and correlated data into an atomized grain for storage and security purposes. The storage of atomized grains is novel. A rule based decision(s) may be made on the importance of the atomized grain that has been created and based on the importance level the storage method may be decided. The storage of atomized grains may be split between important and less important data and both maybe stored in different locations for security and cost saving. The atomized and correlated data may be compressed and stored at any location. Evaluating and enriching the atomized grain based on a contextual content and adding value by correlating the atomized grain to create an atomized and correlated data is done by the system dynamically. The constraint of processing and storage may be based on budget and rules. For example, budget could encompass a set of computing resources, time, common frequency of change to data, data freshness requirements, fiscal resources etc. Rules might include access control, privacy settings based on user and organization, automatic storage of certain data on premise, off-premise or both, etc.

An atomized grain may be of any segment or size (for example a single character like an apostrophe, a word root or suffix/prefix etc.) and may depend on the type of data. For example if it is a video format the grain may be a detected object segment, an associated audio segment, time code segment, segmentation based on compression schemes or sequence by a phrase or speech. This example is just to illustrate the atomized grain in the video file and similar atomized grain formation may be done for varied data that has been acquired. It would be clearer in the following paragraphs when illustrative examples are discussed.

Reconfiguration of atomized data and correlated data 502 is done by LACE and stored in a database 120 (data storage) as a reconfigured data 504. The reconfigured data may be presented to the user or to another software process or to LACE as a new source for content and context for further processing. LACE may be embedded or may be standalone software or as a system solution. LACE may also reside in any layer. It may a part of firmware, hardware, software and/or between the existing programmed codes.

Reconfigured data 504 is processed by LACE 308 to create new data 514. The new data 506 created using this process has enriched data that has a value added component to the content data and is stored in the database. The new data 506 is incorporated (516) by using LACE into the content data 400. The user dynamically uses enriched data to gain context and value. LACE also observes behavior of the user and incorporates the elements to enrich data. The enriched data may be presented using relevance and ranking and the user may choose to incorporate for their use. All the data generated is discoverable, searchable and stored in secured locations such as on device, on premises behind firewalls, cloud and/or combined remote locations. The content data may be used by the user for data production, data processing and/or data publication. LACE also allows the user to discover existing relationships between various data or units of data.

Figure 6:
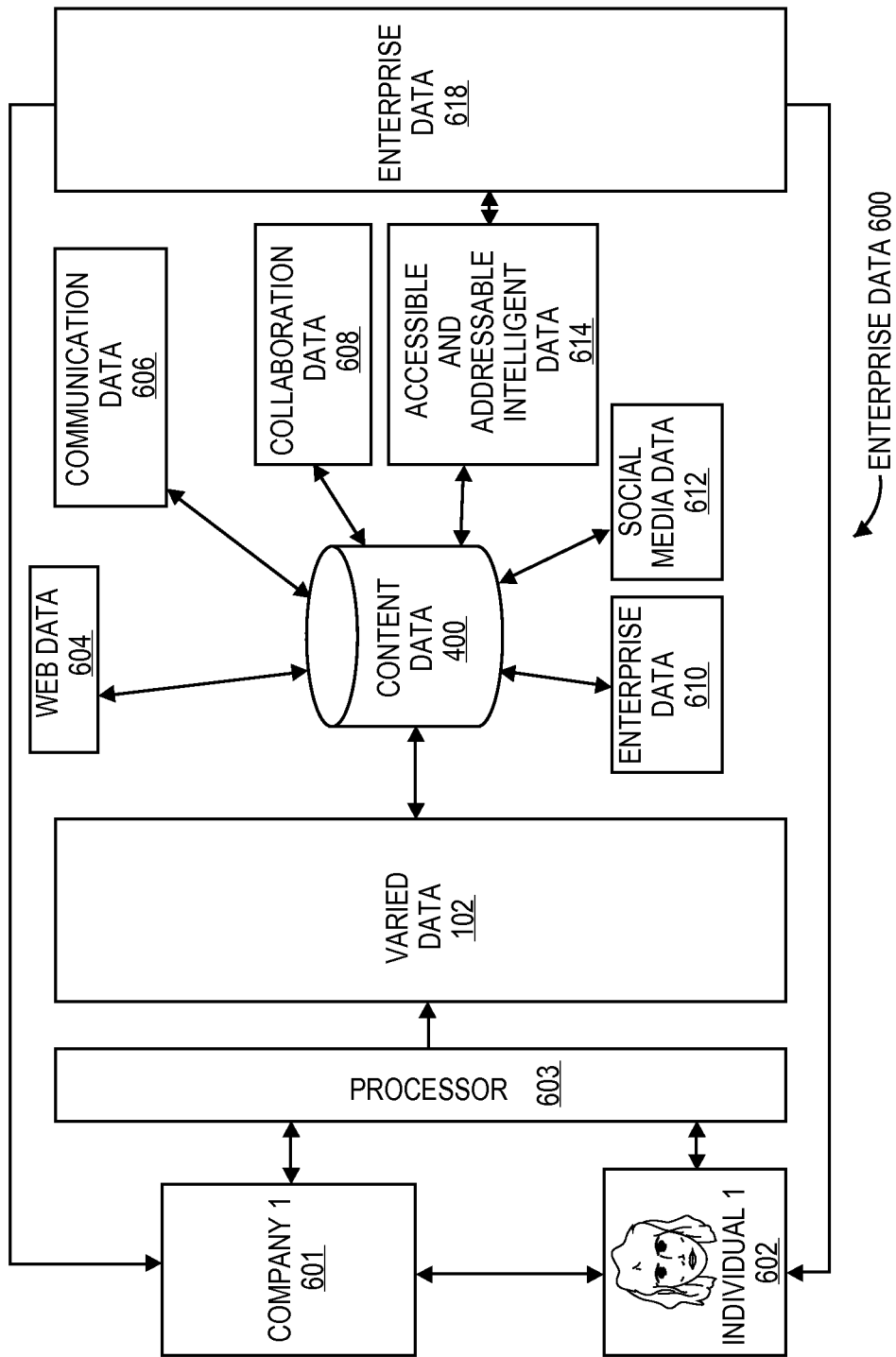
FIG. 6 shows a system flow for an individual data and enterprise data 600, according to one or more embodiments.

FIG. 6 is an illustration of enterprise data 600 or user level data processing as a flow chart for a system. Company A 601 or user 602 may use the system 600 to access their content data 400 using a machine readable medium/processor 603. Content data 400 in this scenario may be mix of varied data 102, web data 604, communication data 606, collaboration data 608, accessible and addressable data 614, social media data 612, and enterprise data 610. The enterprise processed data 618 is the data that has been LACE processed and enriched data that is presented to the user as an accessible and addressable intelligent data 614. The other varied data are organized, integrated and LACE processed to become accessible and addressable intelligent data 614. The enterprise system or user system enables the data to be shared, allocated, governed and implemented using constraints and rules. The data may be produced dynamically using the same rules and constraints. This whole system and method makes the user productively efficient and effective. In addition to improving the effectiveness through the precise delivering of content, data and information the system in parallel, drastically improves collaboration, management, control, crowd-sourcing, resourcing and performance evaluation of human resources across a company or individual user community. The allocation of data to the relevant individual may be based on an atomized grain level or at the enriched data level. The system enables the user to use LACE for discovery of content, information, data, context awareness, and benefit from precise and absolute associations. This also enables the user to seamlessly collaborate with other users in a secure and governed collaboration, even across corporate boundaries, common with sales channels, partners, customers and individuals across the social communities. One of the novelties of the LACE system is dynamic tuning of relationships based on time scale of data changes and not necessarily based only on user interaction or activity (asynchronous to user activity). LACE also helps varied data to be incorporated and value added to content data and correlated to the whole system. LACE when used in a method of data management and system for data management, performs a series of steps which comprises of dynamically recognizing the natural structure of the various data, ingesting a data input by the user, atomizing, or reatomizing and correlating the data, monitoring change of data, separating the secure and non-secure data for optimizing storage and maximizing security, recreating the atomized and correlated data, storing across one or many data storage instances, virtual machines (vms) or locations; for example, cloud or local databases or remote databases, managing user data be it single or multiple user, dynamically analyzing and synthesizing, enriching with relevant contextual data, presenting either to the user or to the software enriched data for publishing or editing and allowing version control. LACE synthesizes new relationships over time based upon known or predictable patterns of context. These patterns are made up of dense absolute correlations, associations, connections, relationships of various data. These absolute associations are not inferred. Utilizing the Atomic Software Components which are managed by the Job Manager Sub-system, these specialized patterns can be automatically compounded or combined dynamically and iteratively to build and maintain rich, context associated data.

The varied data such as, but not limited to, internal, internet, and/or enterprise wide audio, video, image, sensor data, numerical and textual data (raw data as well) for individual or multiple users may be used by the user for being managed by LACE.

The content data may be shared by a team, for example, and the tasks may be appropriately assigned to a team member with the right expertise, talent, chargeable rate, schedule, fatigue and availability. The LACE allows the user to roll back on the version control over time and various users and create a version control of all content data. The atomization, correlation, reconfiguration of atomized and correlated data, new data formation may be performed across one or many databases, instances, virtual machines and locations.

Figure 7:
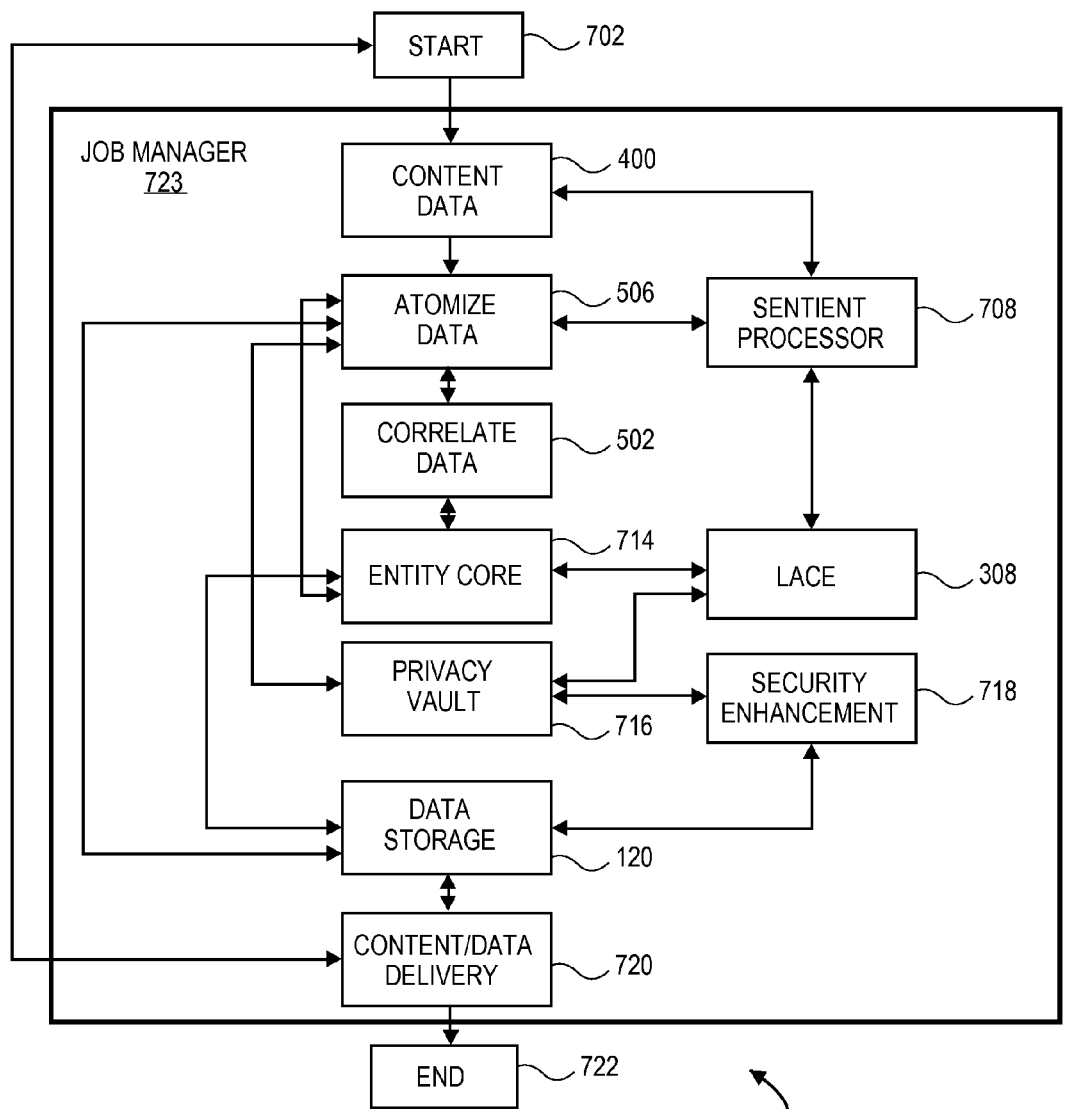
FIG. 7 shows a method of data enrichment 700, according to one or more embodiments.

In another embodiment, as shown in FIG. 7, a software workflow as a job manager 710 may house many processing components. The method of data enrichment shows a content data 400 is processed by a sentient processor 306 that may house LACE to atomize data 510. Once the data is atomized it may be correlated 502. LACE and Sentient Processor Sub-systems are just examples of subsytems that are made up of many specialized Atomic Software Components that are dynamically and iteratively instantiated and managed by the Job Manager. The entity core 304 may decide which layer of hardware needs to be used to process LACE. Privacy vault 702 houses the constraints and rules of an instant user and enhances the security 706 for the content data 400. Atomized data 510 and entity core data may be kept in data storage 120. Content data delivery 704 may be done for the user from data storage 120. This is one embodiment that may be less complicated and may serve the purpose of limited budget users.

Figure 8:
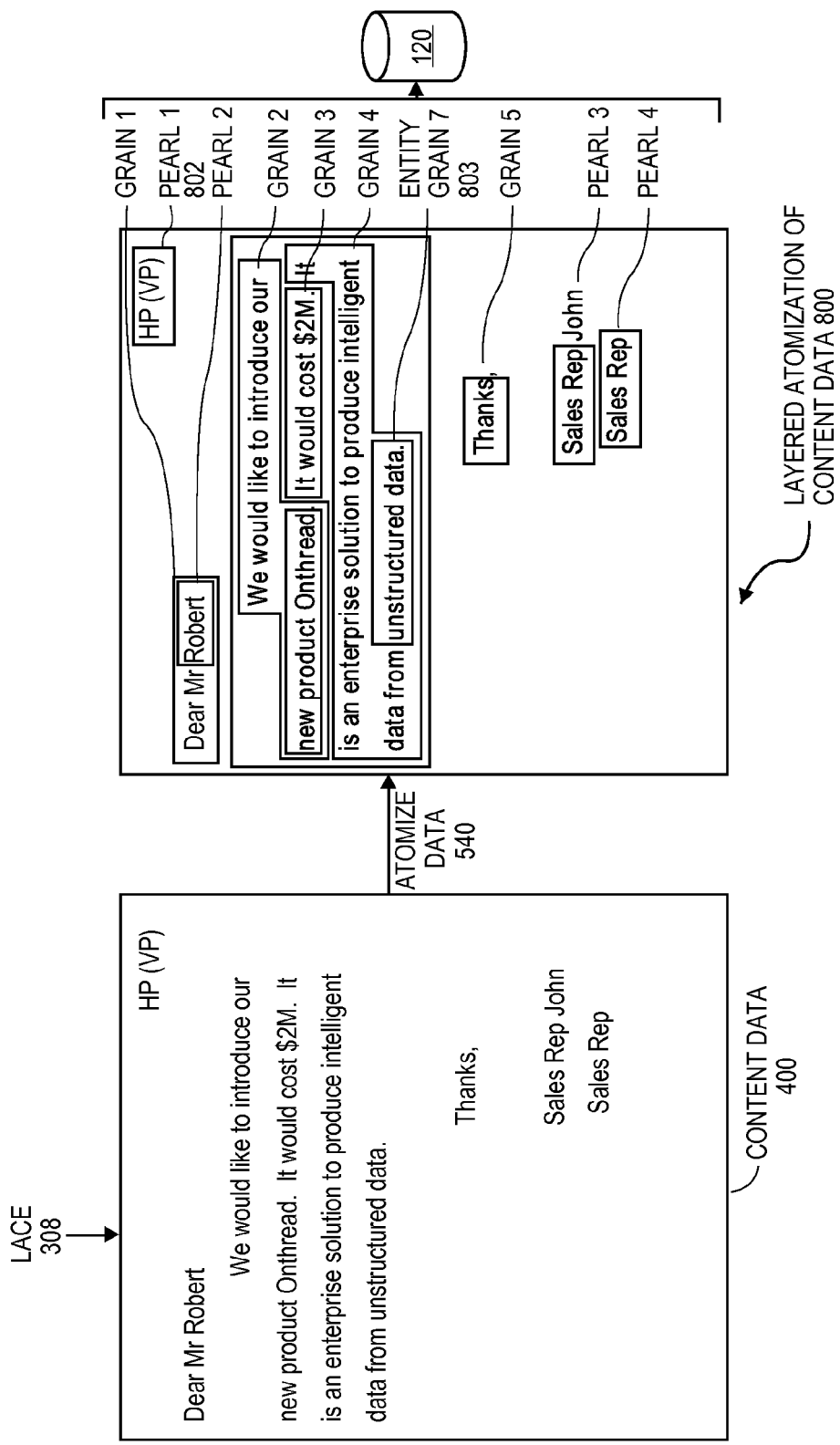
FIG. 8 shows an example of layered atomization of content data 800, according to one or more embodiments.

FIG. 8 depicts a simple scenario of layered atomization of content data 800. Content data 400 is shown as a letter written by a sales representative to a vice president offering sale of a software called Onthread™. The content data 308 is processed into atomized data 540 and basic associations by the atomizer subsystem. The customary address to a person whom it is addressed to, the product, the price are atomized as grains and the fillable format such as name, name of the person who has written the letter and their designation are atomized as pearls. A Pearl Grain can be associated with any arbitrary length segment from a local and/or an external integrated database such as an ERP or CRM, HR or Service Cloud. Changes to these external integrated records, fields or objects, can be immediately captured by LACE. These external associated pearls, provide additional correlation and context to the grains throughout LACE and other parts of the system. Grains and pearls in this instant are just an example of the distinction that the atomization process is accomplishing by ingesting the data and atomizing at a lower and higher level for preliminary correlation process. All the data thus processed is stored in the data storage/database 120. LACE continues the cyclical process of capturing associations progressively over time as user's interact with the data within its system or any associated data in integrated external systems (e.g., CRM or ERP, etc.) under various context.

Figure 9:
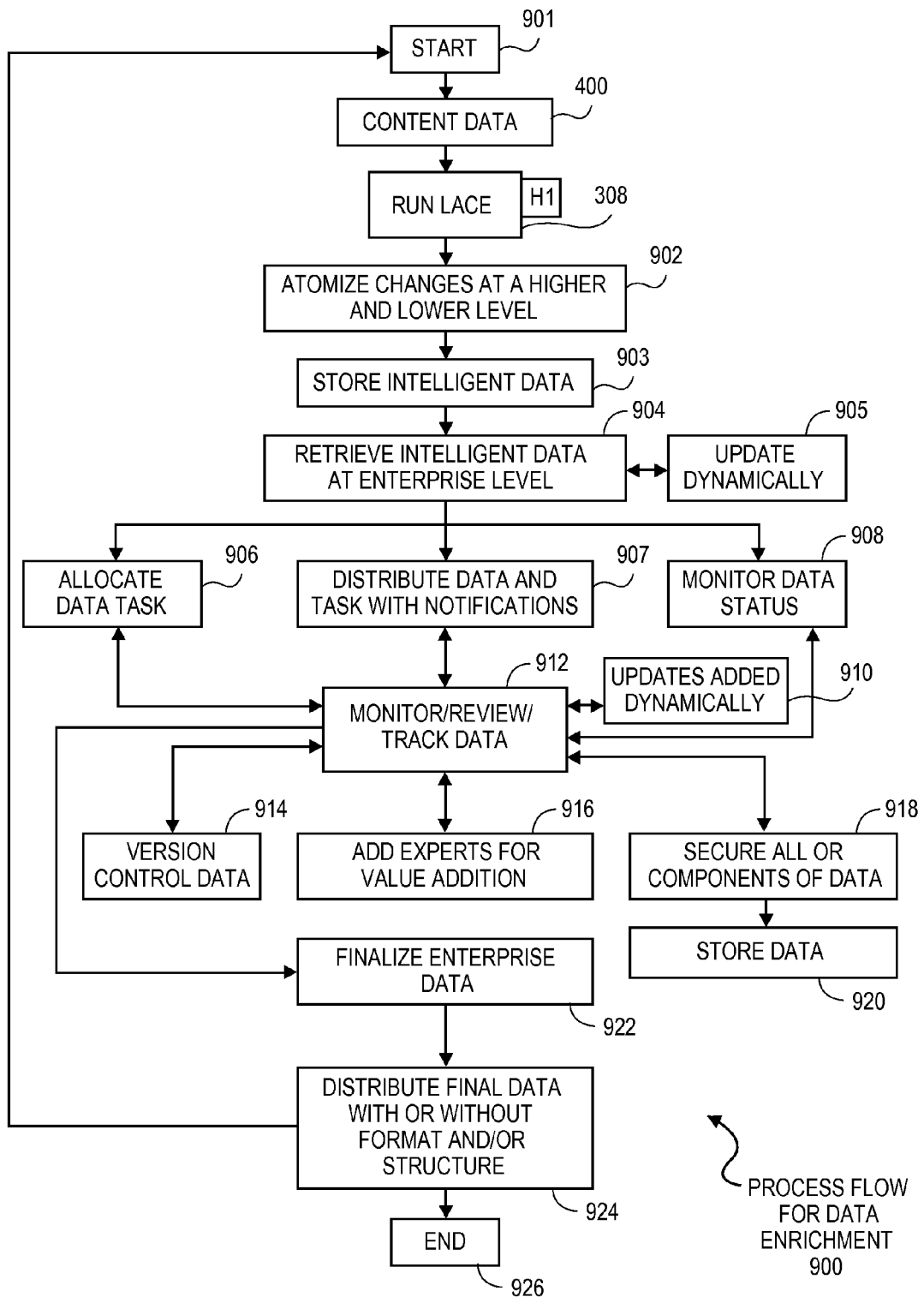
FIG. 9 shows a process flow for data enrichment 900, according to one or more embodiments.

FIG. 9 is a process flow for data enrichment 900 for an instant where there is more liberal budget for processing power and constraints and rules are a bit more stringent. The process runs LACE 308 on the content data 400 and atomizes the data and make changes to the data at higher and lower level 902. This atomized data is intelligent data 903, which is stored in database 120. The intelligent data is updated dynamically 905 and retrieved at enterprise level 904 or individual user level. The retrieved intelligent data is used for allocating the data to pertinent person/persons (may be machine or machines) as a task 906, distribute the data and task notifications 907 and monitor data status 908 once the data is distributed. Updates on the distributed intelligent data are done dynamically 910 and also while monitoring, review and tracking the data 912. If the entity has rules and constraints on the version control on the data 914 it is applied at this point. In one embodiment, an expert is added for value addition if it is identified by the system that intelligent data has identified an expert for a particular grain and/or atomized data content who may bring additional value for the business process as shown in step 916. For example, this value may be as a subject matter expert, a company consultant, partner or a governance or compliance role such as legal or corporate marketing. The rules may require that all data or components of the data that are sensitive may be secured 918 and stored 920. The data after this step is finalized 922 and may be distributed as final data with or without any format and/or structure 924.

Figure 10:
FIG. 10 shows how legal data 1000 is enriched, according to one or more embodiments.

FIG. 10 shows a specific example of a legal document that is a content data which would use the method, system and process to varied data and transform to value added data. The legal data 1000 contains many parts and is shown as a document screen shot. The left panel shows parts of the entire document 1006 for software licensing with its components. The right panel shows inventive steps of including the drop down menu 1008 for selecting relevance, solution, customer, wins, talent associated for this particular page that is being displayed on the left hand side. Subsequently the team members and the relevant talent is displayed as icons at 1010 and 1012. The use of these icons with a specific person associated with it is to allocate, change, retrieve their version or seek help from the experts in the field to have a most appropriate legal document for software licensing. The atomized data called "grain" or "pearl" 1002 in this case is the name of the parties that are involved in licensing, 1006 shows the pertinent components of the document so that when clicked on each component the left hand panel shows the talent involved with that particular section and the middle section 1004 displays the text or content of the document. All three panels are automatically updated and synchronized when the middle panel changes or when a new document is displayed. The boxes around the grains are performed by other software's that are commercially available. The whole purpose of the illustration is to emphasize that the chosen grains and pearls are asynchronously, dynamically enriched for context and the user does not even perceive the changes that are happening dynamically.

Figure 11:
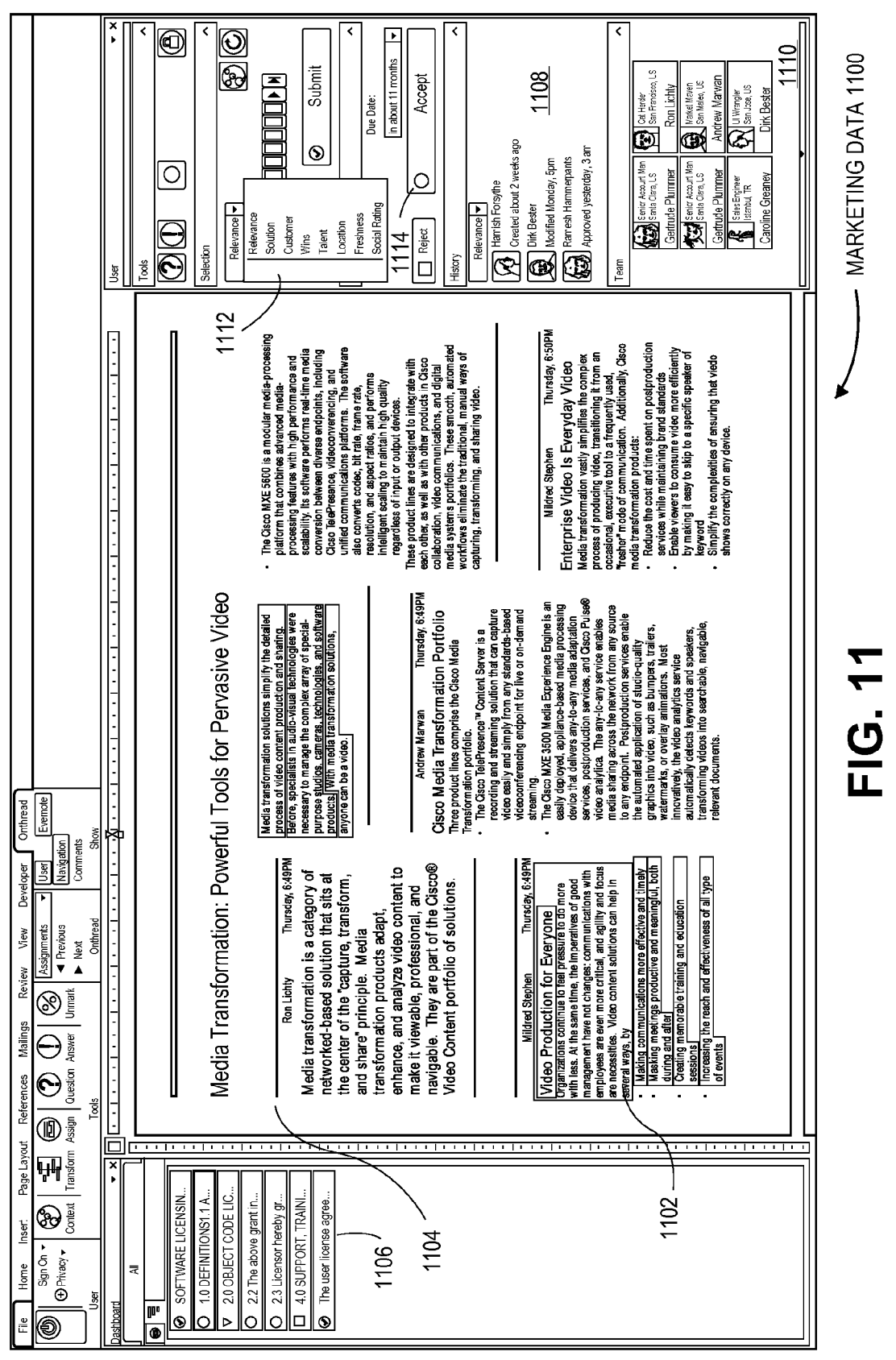

FIG. 11 shows an example of the marketing data 1100. Similar to legal data 1000 there are three panels in the display of this example as well. Marketing documents are very important for any company or individual. The seamless integration of content data with all the historical data available to all team member or user is of utmost importance. The relevance ranking or wins 1112 on the drop down menu enables the user to pick language, messaging, positioning, case-studies, emphasis and expertise that have a proven history of successful outcomes in the marketing data 1100. Once the document is retrieved from the database 120 and displayed on the user interface LACE has already atomized, correlated and value added to the content data 1104 dynamically and automatically proposes the team 1108, divides the document into appropriate assignment regions and suggests experts 1120 and most relevant atomized grains and pearls in the document that may be of significance to the user. This example/module may include video and audio files as well. LACE is run on the document and the varied data input by varied users are dynamically atomized and correlated. The enriched data is then displayed for each user. The user can select an atomized grain and/or pearl just by browsing over the document and allocate the pertinent segment to the expert who is being displayed on the right hand column for participation. Additionally, Pearls can be dynamically and automatically updated from structured data fields from external or internal databases. Once the expert or the pertinent person accepts the allocation he or she might add value to the document and it is dynamically updated and secured.

Figure 12:
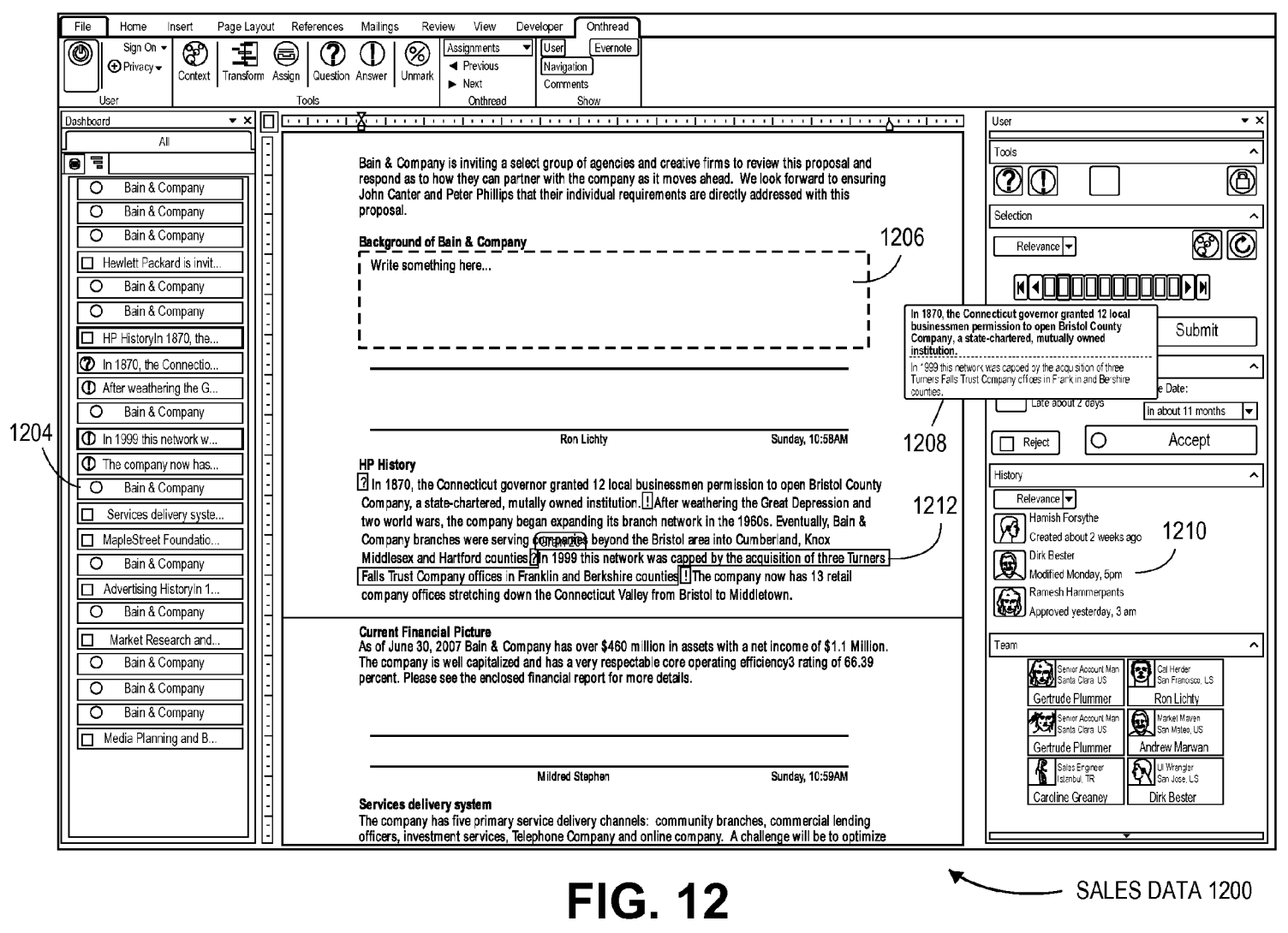

FIG. 12 shows the sales data 1200. The most competitive and the toughest job are for the sales professionals. They manage worldwide sales and have to access to the recent developments and the winning bids to tailor their pitch to the next customer. The right panel shows 1204 shows the list of companies that a suitable collection of content is relevant to. However, they also have access to a large database of other precisely relevant pieces of customer and prospect documents pertaining to contextually related sales tasks. This provides the opportunity for the sales person to collaborate, harvest ideas, assemble documents and competitive assessment opportunity at a given time. The user may write in space 1206 and the document is mapped to the creator of the paragraph that shows up on the right panel as the originator at 1210. Each atomized and correlated grain is also enriched by using varied data, internal data and external data to help the user. The section 1212 is formatted according to acceptable rules and constraints of the document type or enterprise wide usage rules. This enables the user to comply with legal or acceptable format. The selection panel 1208 displays facts and figures from variety of sources so that the user is well prepared for direct sales pitch. The type of data management software, process and method empowers the sales person dynamically with the most current updates and makes the document pertinent with little effort. The dynamic contextual update reflects the change for all the users that are using the process and it is stored in the database securely.

Figure 13:
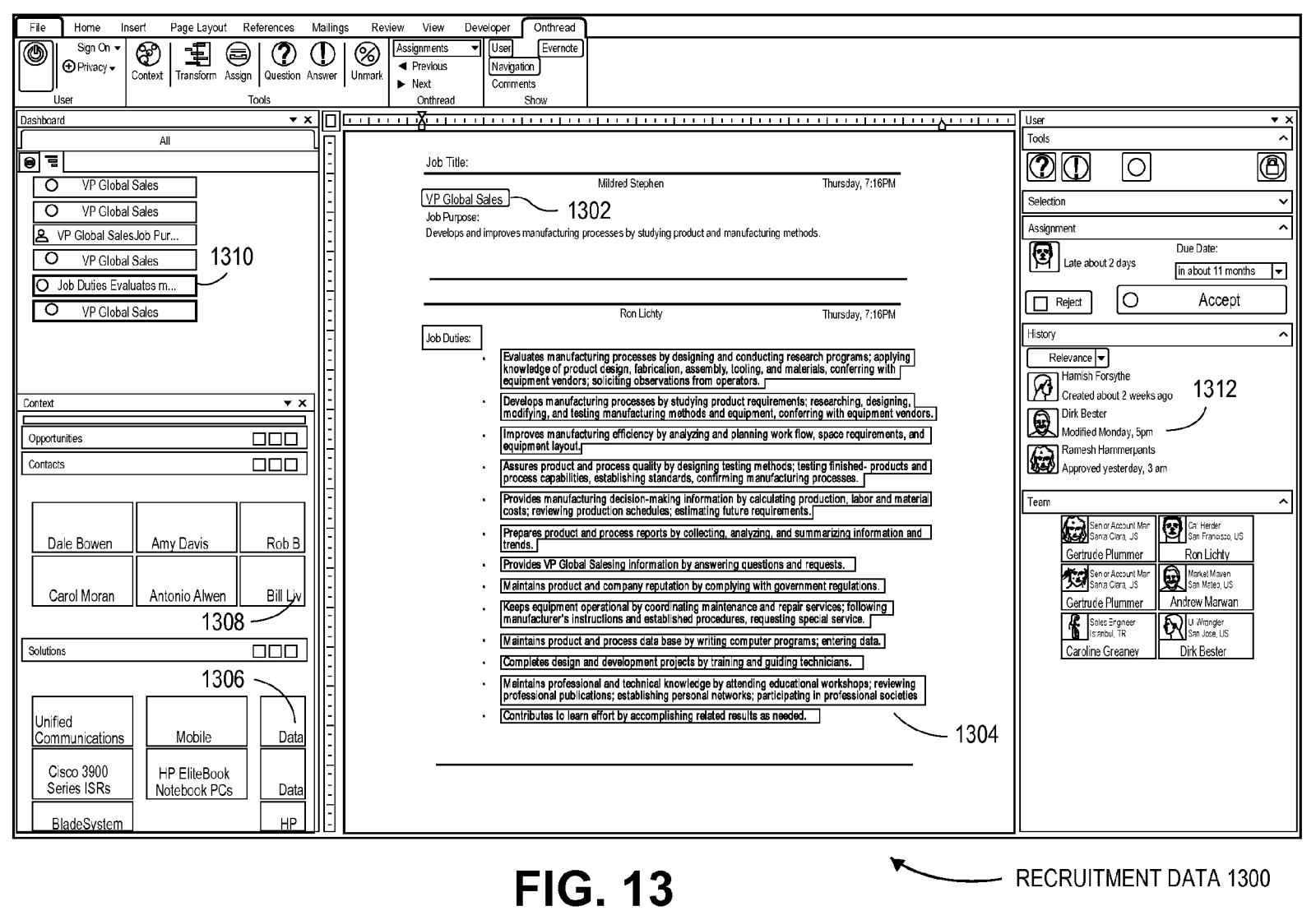

FIG. 13 shows the use of the data management system, method and process for recruitment of talent 1300. In a job seeker environment a document is produced indicating the job title 1302, job description 1304, and the organization structure that may be involved in selecting that particular candidate 1308. The recruiters, experts or contacts that may refer the candidate 1306 may be connected with that particular job. This may also make use of social media web sites and professional web sites such as LinkedIn. A job description can be assembled by combining the contents and context from several reference leading practice curriculum vitaes (CVs) most related to the new job posting. This posting and the combined context surrounding the reference and new curriculum vitae can be posted on LinkedIn but also be used to automatically to query a ranked list of most strongly associated CVs from a professional or recruiting web site.

Figure 14:
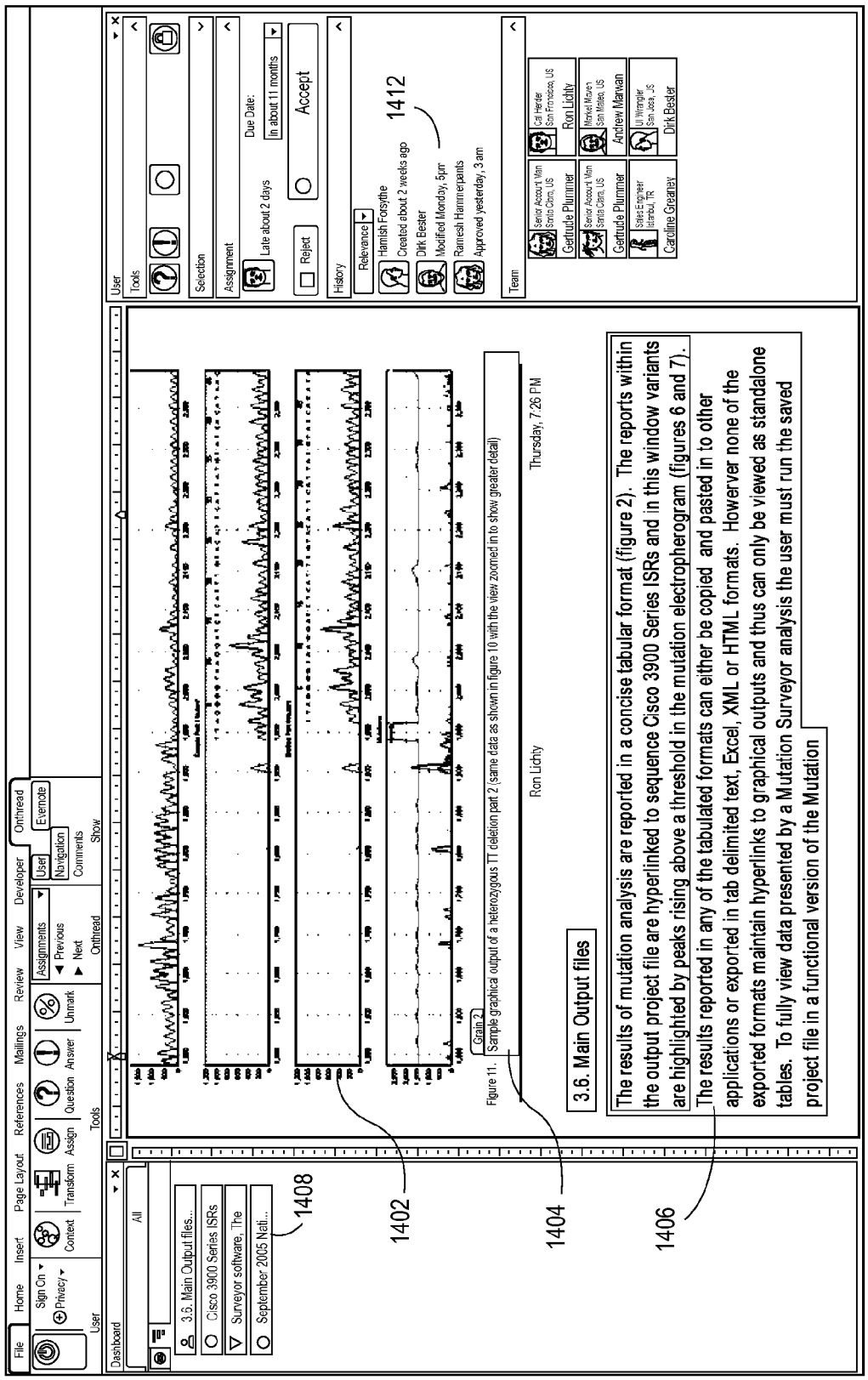
FIG. 14 shows how scientific data 1400 is enriched, according to one or more embodiments.

FIG. 14 shows the use of LACE and data management system for complex data such as scientific data 1400. User may use sequences of genome and/or protein to identify mutations, deletions 1402, diseases, to format drug design for personalized medicine, controlled sharing of data with insurance and health care providers about an individual, animal and/or disease specific sequences 1402. The dynamic context enrichment provides scientists and health care providers with a powerful tool to treat, find relationships of data and information and in many cases improve pertinent diagnosis and care for a patient. As an example, but not limited to, a sequence of a cancer patient's DNA or infectious disease antibody may be used to find out the spread, medications, treatment mode, insurance coverage etc. The description of the graphical file may be done at the bottom 1406. The related personal 1412 may be listed on the right hand side panel. For the patient or the user interface queries, shops, new treatment articles and doctor communications may be displayed with dynamic update on the right hand side panel. Enriched sequence data provides a powerful tool for scientist and health care providers with correct diagnosis and treatment options. Dynamic update with most recent case studies and literature allows the health care provider to access cutting edge data to treat their patients effectively.

Figure 15:
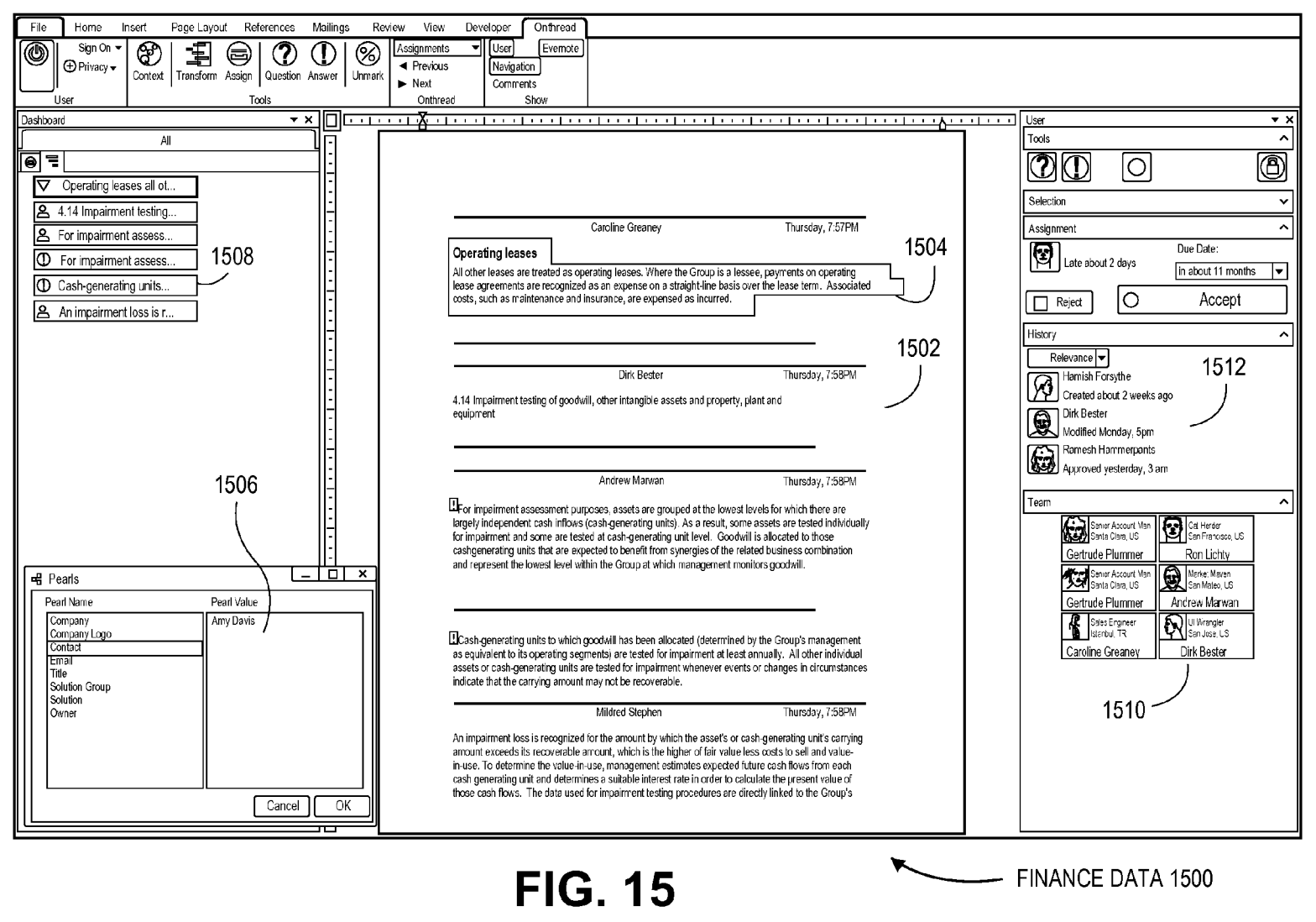

FIG. 15 shows context enrichment of legal data 1500. Various properties of financial data such as operating leases etc., 1508 and creation of pearl 1506 is on the left hand side panel. The author or user of the specific document has a document generated by the system and users the atomized data from various sources within the system 1504. The template 1502 for writing a contract or lease agreement is created using such atomized and correlated data. The enriched data is incorporated as content data and displayed on the user interface. The data on the user interface is dynamic and automatic atomization and correlation produces new grain and pearls. Each instance is assessed for security constraints and rules and data stored in a specified format in locally or in cloud.

Figure 16:
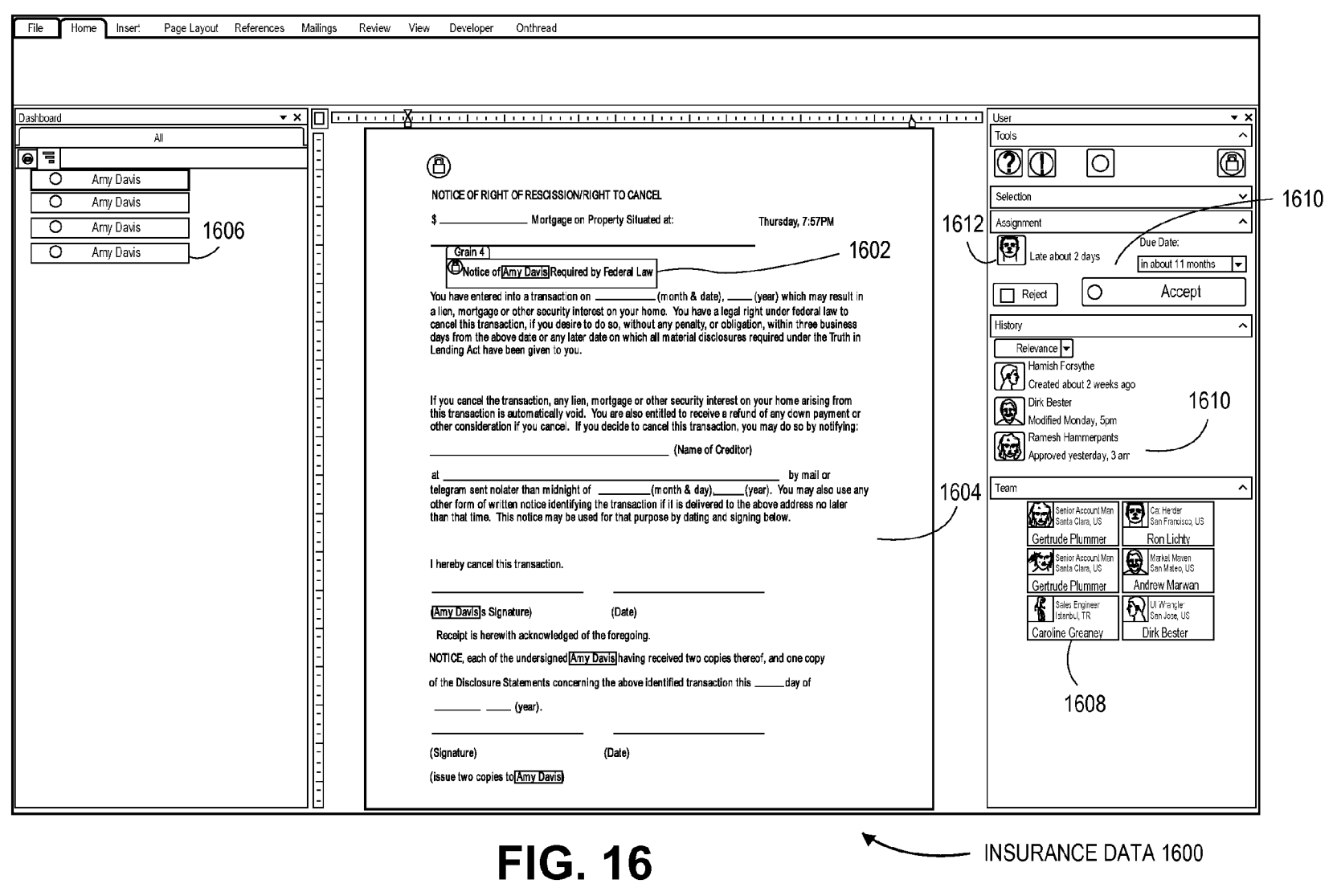

FIG. 16 shows an insurance data 1600. Insurance industry needs most accurate instant data for providing quotes, claims, underwriting and issuing policies. Insurance industry is heavily regulated and requires a lot of rules and constraints to be built in and accurate personal data be gathered and stored securely. For example a car needs to be insured and the insurance agent gets a document that has a prepopulated document. However, the customer car identification number is a grain or a pearl to be typed in and various factors such as accident history, verification of ownership, previous insurance records, loan document details etc., are obtained from various commercial databases at present. In the instant data management system and method the dynamically populated data would be atomized and correlate disparate data to provide the most recent updates. The quote formulas based on rate, zip code and address would be populated and the user may be allowed to compare rates for themselves. Rate comparison exist but disparate databases for information retrieval and lack of dynamic updates hinder the insurance companies to service their customers in an efficient way.

Figure 18:
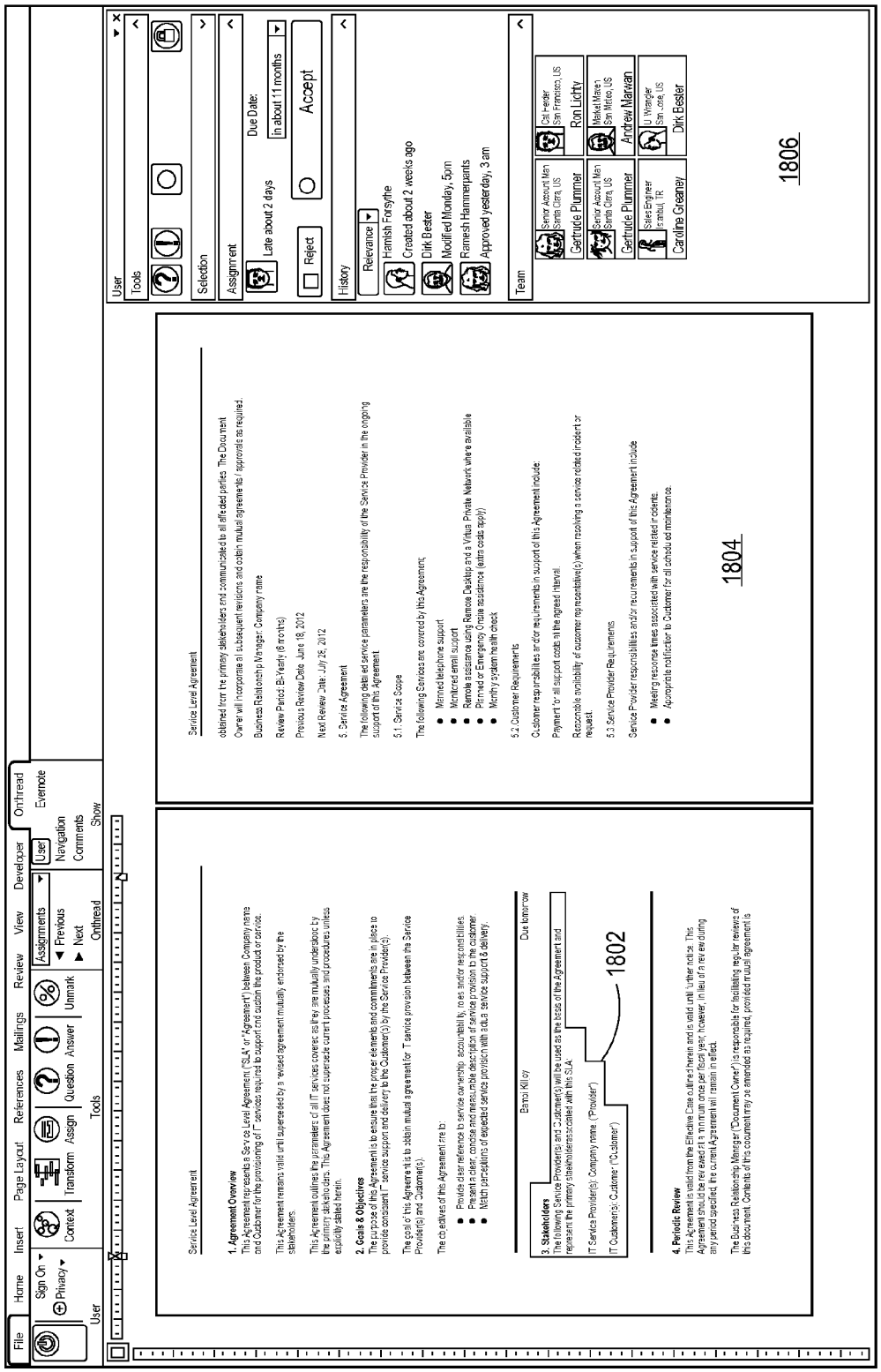
FIG. 18 shows how service level agreements 1800 are enriched, according to one or more embodiments.

Similarly FIG. 17 and FIG. 18 show project management and business requirement data management flow. In the high technology and IT Communication market segments, Service Level Agreements (SLAs) are very common agreements to govern the contracting of services (e.g., Service Providers for Cloud or SaaS service, etc.). Just as it is described in FIGS. 6 to 16. The grain and/or pearl generation by atomizing and correlating data for user/users gives them an edge over the competition by being current. The enriched data gives the user the opportunity to present and receive the most up to date data and streamline the assembly of an agreement to provide the service.

Figure 19:
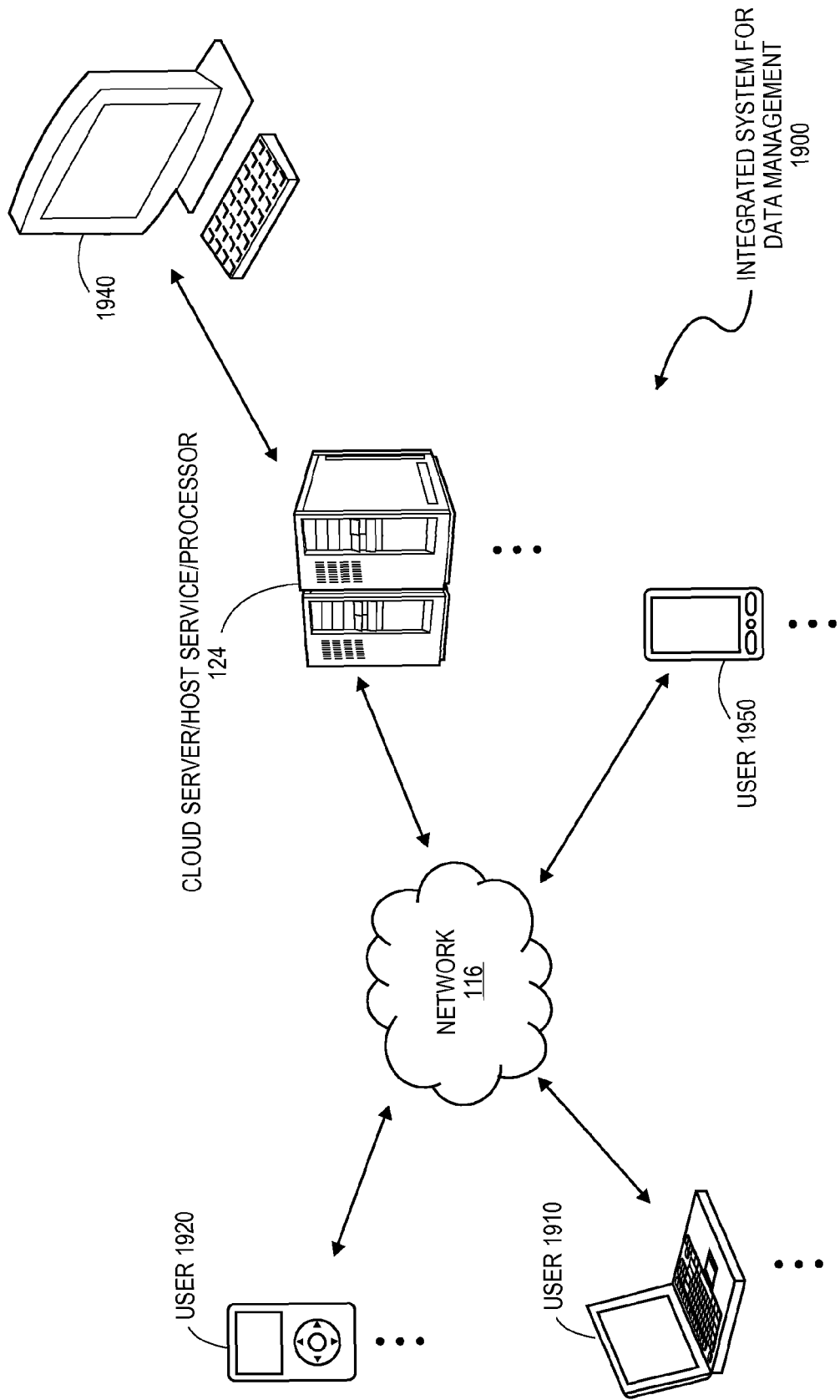
FIG. 19 shows an entire system for processing varied data and enriching the varied data 1900, according to one or more embodiments.

FIG. 19 is a systematic view of an integrated system for data management 1900 illustrating communication between user and the server through a network, according to one embodiment. In one embodiment a user or multiple users may connect to the server that hosts the multimedia tool in the system. In another embodiment, the user hard ware such as a PDA, mobile device such as tablets etc., computer or a mobile phone or any wireless device, or an electronic book (e-book) may be connected with each other or work independently to allow the user to use the multimedia tool for education, learning, and/or interactively playing games. The network 110 may be a LAN, WAN, mobile, telecommunications, internet, intranet, WiFi and/or ZigBee network, etc. The user/individual 1910, 1920 and 1950 and so on may be an individual, a parent, a scientist, an author, but not limited to these group of folks only. The user and individual are used interchangeably and mean the same. The user may be any person who accesses the data management system for various activities as discussed in different case scenarios in the supporting figures. The cloud server 124 may also be used for storing data and processing. The data management tool may be accessed to search, create content, upload content, view content, use the content and save and/or delete the content. The server may be stand alone, cloud based or hosted services.

Figure 20:
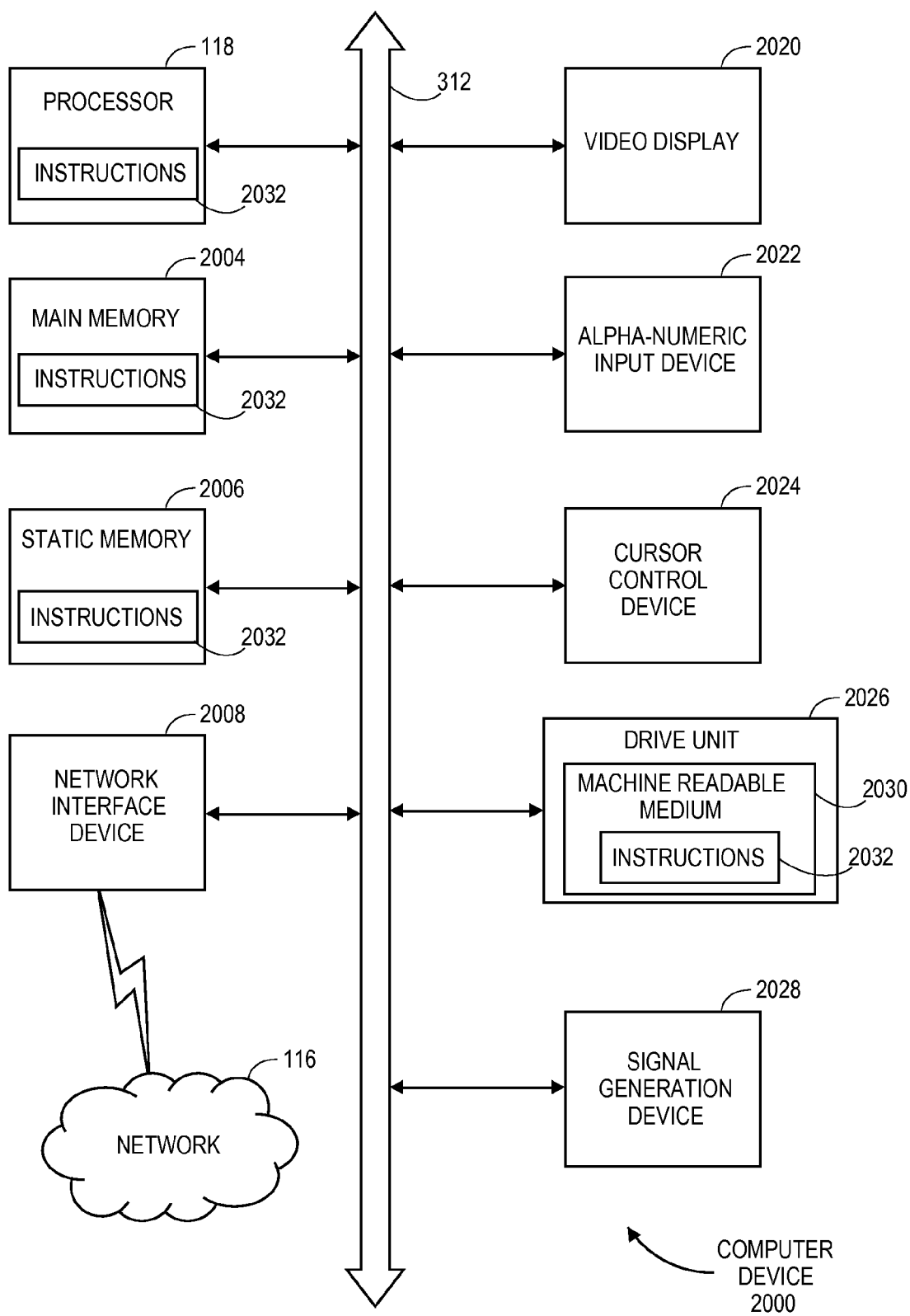
FIG. 20 is a diagrammatic system view of a computer device view in which any of the embodiments disclosed herein may be performed, according to one embodiment.

FIG. 20 is a diagrammatic system view 2000 of a computer device view in which any of the embodiments disclosed herein may be performed, according to one embodiment. Particularly, the computer system view 2000 illustrates a processor 118, a main memory 2004, a static memory 2006, a bus 312, a video display 2020, an alpha-numeric input device 2022, a cursor control device 2024, a drive unit 2026, a signal generation device 2028, a network interface device 2008, a machine readable medium 2030, instructions 2032, and a network 116, according to one embodiment.

The computer system view 2000 may indicate a personal computer and/or a data processing system (e.g., server) in which one or more operations disclosed herein are performed. The processor 118 may be microprocessor, a state machine, an application specific integrated circuit, a field programmable gate array, etc. The main memory 2004 may be a dynamic random access memory and/or a primary memory of a computer system. The static memory 2006 may be a hard drive, a flash drive, and/or other memory information associated with the computer system. The bus 312 may be an interconnection between various circuits and/or structures of the computer system. The video display 2020 may provide graphical representation of information on the data processing system. The alpha-numeric input device 2022 may be a keypad, keyboard and/or any other input device of text (e.g., a special device to aid the physically handicapped). The cursor control device 2024 may be a pointing device such as a mouse.

The drive unit 2026 may be a hard drive, a storage system, and/or other longer term storage subsystem. The signal generation device 2028 may be a bios and/or a functional operating system of the data processing system. The network interface device 2008 may be a device that may perform interface functions such as code conversion, protocol conversion and/or buffering required for communication to and from a network (e.g., the network 116 of FIG. 1). The machine readable medium 2030 may provide instructions on which any of the methods disclosed herein may be performed. The instructions 2032 may provide source code and/or data code to the processor 118 to enable any one/or more operations disclosed herein.

The instant system, method and process enables the right information at the right time to be intelligently and securely updated, maintained, and recombined dynamically across databases and delivery channels. The constraints and rules may be implemented in compliance to any user/users organization. The system, method and process eliminate information senescence and mutation, ensuring that internal and external user/customer gets the information they need to achieve their objectives. Even though the software is platform agnostic the display also is platform agnostic. The additional security enables the user of different professions to be comfortable to use it on any device including mobile devices.

Although the present embodiments have been described with reference to specific example embodiments, it will be evident that various modifications and changes may be made to these embodiments without departing from the broader spirit and scope of the various embodiments.

What is claimed is:

1. A computer-implemented method of data management, comprising:
    recognizing of a natural structure, relationship, association and correlations within a data present in a given environment as a content data, wherein the content data is a combination of an atomized data, a reconfigured data and a new data, wherein the data management is an enterprise data management;
    capturing the content data and a context of the content data and a relevant external data residing as at least one of an internal data and relevant external data;
    running a layered asynchronous context enrichment software on a machine-readable medium on the content data, internal data and relevant external data present in the given environment to transform as an atomized grain by ingesting the content data, internal data and relevant external data present in the given environment and atomizing at a lower and higher level for preliminary correlation;
    evaluating and enriching the atomized grain dynamically and asynchronously based on a contextual content and adding value by correlating the atomized grain to create an atomized and correlated data;
    segmenting the content data, relevant data and atomized and correlated data based on predefined rules for security and dividing them into a sensitive and non-sensitive data;
    storing the content data, relevant external data and atomized and correlated data, sensitive data and non-sensitive data in at least one of a same location and different location in a data storage;
    retrieving a reconfigured data from the database to present to a user as the new data;
    dynamically annotating using layered asynchronous context enrichment software on the new data and presenting to the user based on a budget and rule constraint; and
    presenting the new data to the user after meeting the budget and rule constraint to the user.

2. The method of data management as in claim 1, wherein reconfiguring the content data, relevant external data and atomized and correlated data, sensitive data and non-sensitive data using layered asynchronous context enrichment software is done to create the reconfigured data; and
storing the reconfigured data in the data storage.

3. The method of data management as in claim 1, further comprising:
    allocating the atomized grain identified by the layered asynchronous context enrichment software as a task to a talent present in the company to fulfill the task;
    updating the availability of the talent based on a time, expertise and success rate for the particular atomized grain; and
    selecting the talent as the best for the task and updating the data in the data storage.

4. The method of data management as in claim 1, further comprising:
    ingesting a data input by the user using layered asynchronous context enrichment software to determine an atomized grain size, wherein the atomized grain size is at least one of a single character, word, a sentence, a paragraph, a cell in excel spread sheet, a row, a social media chat, a sequence of video or audio.

5. The method of data management as in claim 1, further comprising:
    incorporating the new data using layered asynchronous context enrichment software into the given environment as the content data;
    dynamically adding value using layered asynchronous context enrichment software to the atomized and correlated data, reconfigured data, new data and content data; and
    presenting the cyclically processed content data, atomized and correlated data, reconfigured data and new data as a content data to the user in real time.

6. The method of data management as in claim 5, further comprising:
    storing the cyclically processed content data, atomized and correlated data, reconfigured data and new data as a content data to the user in real time.

7. The method of data management as in claim 6, further comprising:
    running the layered asynchronous context enrichment software at a multi-layer level, wherein the multi-layer level is at least one of a firmware, hardware and software layer while creating the content data, atomized and correlated data, reconfigured data and new data.

8. The method of data management as in claim 1, further comprising:
    distributing the new data to at least one of a team, group, individual and an expert as a task for adding value within the enterprise;
    monitoring the progress of the task on the new data allocated to the team, group, individual and expert within the enterprise in real time; and
    updating the new data using layered asynchronous context enrichment software after value addition as the content data in the enterprise.

9. The method of data management as in claim 8, further comprising:

running the layered asynchronous context enrichment software at least one of a firmware, hardware and software layer and creating a value added data.

10. The method of data management as in claim 9, further comprising:
securing the content data and the value added data created by at least one of a firmware, hardware and software layer.

11. The method of data management as in claim 10, wherein the content data is at least one of a structured data, semi-structured and unstructured data.

12. The method of data management as in claim 11, further comprising:
complying with existing business process constraints and rules in the enterprise while creating the value added data at the enterprise level.

13. The method of data management as in claim 12, further comprising:
dynamically updating the content data to the value added data which is discoverable and editable.

14. The method of data management as in claim 13, wherein the content data is at least one of financial data, marketing data, insurance data, project data, sales data, service and support data, social data, raw data, consumer data, entertainment data, scientific data and health care data.

15. The method of data management as in claim 14, further comprising:
organizing and structuring the content data and the value added data for multiple department based on relevance;
delivering the content data and value added data to the appropriate individuals in an enterprise system.

16. The method of data management as in claim 15, further comprising:
prioritizing the content data and value added data based on a governance, compliance, budget and rule constraint.

17. The method of data management as in claim 16, wherein the rule constraint is at least one of a version control for the content data and value added data and number of iteration the layered asynchronous context enrichment software should run on content data and value added data.

18. A system for data management, comprising:
a user interface;
a non-transitory machine-readable media to run a layered asynchronous context enrichment software at multiple layer for an enterprise wide system; and
one or more processors in at least one of a firmware, hardware and software layer to execute the layered asynchronous context enrichment software coupled to the user interface, the system for data management configured to:
run a layered asynchronous context enrichment software on the content data, internal data and relevant external data present in the given environment to transform as an atomized grain by ingesting the content data, internal data and relevant external data present in the given environment and atomizing at a lower and higher level for preliminary correlation and creating a value added data;
evaluate and enrich the atomized grain dynamically and asynchronously based on a contextual content and adding value by correlating the atomized grain to create an atomized and correlated data;
segment the content data, relevant data and atomized and correlated data based on predefined rules for security and dividing them into a sensitive and non-sensitive data;
retrieve the reconfigured data from the database to present to a user as the new data;
dynamically annotate using layered asynchronous context enrichment software on the new data and presenting it to the user based on a budget and rule constraint; and
present the new data to the user after meeting the budget and rule constraint to the user.

19. The system of data management of claim 18, further comprising:
a database to store a content data and value added data that was dynamically created; and
a secure network to gather a content data, an internal data and a relevant external data, wherein the content data is a combination of an atomized data, a reconfigured data and a new data, wherein the system data management is an enterprise system data management.

20. The system of data management of claim 19, further comprising:
monitor the progress of the task on the new data allocated to the team, group, individual and expert within the enterprise in real time; and
update the new data using layered asynchronous context enrichment software after value addition as the content data in the enterprise wide system.

21. The system of data management of claim 20, further comprising:
harvest context from varied data, external data and internal data to correlate data.

* * * * *